(12) United States Patent
Tojo et al.

(10) Patent No.: US 8,076,393 B2
(45) Date of Patent: Dec. 13, 2011

(54) INK COMPOSITION, INKJET RECORDING METHOD, AND PRINTED MATERIAL

(75) Inventors: Kaoru Tojo, Ashigarakami-gun (JP); Norihide Shimohara, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 504 days.

(21) Appl. No.: 12/198,528

(22) Filed: Aug. 26, 2008

(65) Prior Publication Data

US 2009/0081420 A1 Mar. 26, 2009

(30) Foreign Application Priority Data

Sep. 26, 2007 (JP) ................. 2007-248535
Jul. 7, 2008 (JP) ................. 2008-176967

(51) Int. Cl.
| | |
|---|---|
| A61K 47/48 | (2006.01) |
| A61L 24/00 | (2006.01) |
| B01F 3/04 | (2006.01) |
| B29C 71/04 | (2006.01) |
| C08F 2/46 | (2006.01) |
| C08F 2/50 | (2006.01) |
| C08G 63/48 | (2006.01) |
| C08G 63/91 | (2006.01) |
| C08J 3/28 | (2006.01) |
| C08K 3/20 | (2006.01) |
| C08L 39/04 | (2006.01) |
| C08L 51/00 | (2006.01) |
| C09D 5/00 | (2006.01) |
| C09D 11/00 | (2006.01) |
| H05B 6/68 | (2006.01) |
| B41J 2/01 | (2006.01) |
| B41J 2/14 | (2006.01) |
| B41J 2/16 | (2006.01) |
| B41J 2/17 | (2006.01) |
| B32B 27/00 | (2006.01) |
| G01D 11/00 | (2006.01) |

(52) U.S. Cl. ................. 523/160; 522/1; 522/6; 522/64; 522/71; 522/149; 522/173; 522/175; 522/184; 523/161; 525/70; 525/73; 525/75; 525/77; 347/1; 347/51; 347/52; 347/95; 347/96; 347/100; 347/102; 428/500

(58) Field of Classification Search ................. 523/160, 523/161; 522/1, 6, 64, 71, 149, 173, 175, 522/184; 525/70, 73, 75, 77; 347/1, 51, 347/52, 95, 96, 100, 102; 428/500
See application file for complete search history.

(56) References Cited

FOREIGN PATENT DOCUMENTS

| EP | 1 788 045 A1 | 5/2007 |
|---|---|---|
| EP | 1 815 978 A1 | 8/2007 |
| EP | 1 882 724 A1 | 1/2008 |
| EP | 1 903 080 A1 | 3/2008 |
| EP | 1 958 788 A1 | 8/2008 |
| JP | 2002-047441 | * 2/2002 |
| JP | 2003-119414 A | 4/2003 |
| JP | 2003-321628 A | 11/2003 |
| JP | 2004-018656 A | 1/2004 |
| JP | 2004-131589 A | 4/2004 |
| JP | 2004-344795 A | 12/2004 |

OTHER PUBLICATIONS

Machine English Translation of JP 2002-047441, Takahashi et al., Feb. 2002.*
European Search Report dated Jan. 29, 2009, English.

* cited by examiner

*Primary Examiner* — Patrick Niland
(74) *Attorney, Agent, or Firm* — Sughrue Mion, PLLC

(57) ABSTRACT

An ink composition includes (A) at least one polymerizable compound selected from the group consisting of a monofunctional radically polymerizable monomer having an aliphatic cyclic structure, an N-vinyllactam, and an aromatic monofunctional radically polymerizable monomer, (B) a radical polymerization initiator, (C) a pigment, and (D) a graft copolymer having a repeating unit represented by the formula below in a graft chain:

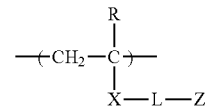

wherein R denotes a hydrogen atom or a methyl group, X denotes a single bond, —O—, —CO—, —COO—, —CONR$^1$—, —OCO—, or a phenylene group, R$^1$ denotes a hydrogen atom, an alkyl group, an aryl group, or an aralkyl group, L denotes a single bond or a divalent linking group, Z denotes —NR$^2$R$^3$, R$^2$ and R$^3$ independently denote a hydrogen atom, an alkyl group, an aryl group, or an aralkyl group, and R$^2$ and R$^3$ may be bonded to each other to form a ring.

15 Claims, No Drawings

INK COMPOSITION, INKJET RECORDING METHOD, AND PRINTED MATERIAL

BACKGROUND OF THE INVENTION

1. Field of the Invention

The present invention relates to an ink composition suitably used for inkjet recording, an inkjet recording method employing the ink composition, and a printed material obtained by employing the ink composition.

2. Description of the Related Art

As image recording methods for forming an image on a recording medium such as paper based on an image data signal, there are an electrophotographic system, sublimation type and melt type thermal transfer systems, an inkjet system, etc. Among these, the inkjet system uses inexpensive equipment and, since an image is formed directly on a recording medium by discharging an ink only on a required image area, the ink can be used efficiently and the running cost is low. Furthermore, there is little noise and it is excellent as an image recording system.

In accordance with the inkjet system, it is possible to print not only on plain paper but also on a non-water absorbing recording medium such as a plastic sheet or a metal sheet, but achieving a higher printing speed and higher image quality are important issues, and the time required for drying and curing droplets after printing greatly influences the sharpness of an image.

As one inkjet system, there is a recording system using an inkjet recording ink that can be cured by exposure to actinic radiation. In accordance with this method, by irradiating with radiation immediately after printing so as to cure ink droplets, it is possible to form a sharp image.

Such a curable ink composition is required to have high pigment dispersibility and stability over time in order to form a high definition image having excellent coloring properties. In order to give the ink composition vivid colors and high coloring power, it is essential to make a pigment very fine. In particular, with regard to an ink used for inkjet recording, since the discharged ink droplets greatly influence the sharpness of an image, the discharged droplets are made small, and it is essential to use particles that are finer than the thickness of a cured ink film formed by the ink. In this way, when pigment particles are made finer in order to obtain high coloring power, it becomes difficult to disperse the fine particles, and aggregates are easily formed. There is also the problem that addition of a dispersant causes the viscosity of the composition to increase. Since formation of pigment aggregates and increase in viscosity of the ink composition both adversely affect the ink dischargeability, it is undesirable to use for inkjet recording an ink composition in which aggregation of pigment, viscosity increase, etc. occur.

Moreover, when an ink composition is used for inkjet recording, since the ink composition is stored in a cartridge, heated during discharge, and cooled when not discharged and when stored, it is exposed to repeated temperature changes from heating and cooling; these temperature changes also adversely affect the pigment dispersibility, the pigment dispersibility deteriorates over time, and there is the problem that pigment aggregation, increase in viscosity, etc. easily occur.

There is therefore a desire for an ink composition that has sufficient fluidity and enables a pigment that has been made very fine to be stably dispersed, and for which a pigment dispersion has excellent stability over time. In order to obtain a stable pigment dispersion various proposals have been made with respect to the dispersant.

In order to improve the affinity for a pigment, an ink composition in which a pigment derivative is used as a dispersant (ref. e.g. JP-A-2003-119414 and JP-A-2004-18656; JP-A denotes a Japanese unexamined patent application publication), an ink composition in which a polymer having a basic group is used as a dispersant for a specific pigment such as a phthalocyanine- or quinacridone-based pigment (ref. e.g. JP-A-2003-321628), and an ink composition comprising a dispersant such as a polyethyleneimine-poly(12-hydroxystearic acid) graft polymer and a specific monomer for dissolving the dispersant but employing no organic solvent (ref. e.g. JP-A-2004-131589) have been proposed. Furthermore, as a dispersant having a secondary amino group in a graft chain, a dispersant comprising a vinyl polymer having a polyethyleneimine in a graft chain (ref. e.g. JP-A-2004-344795) has been proposed.

BRIEF SUMMARY OF THE INVENTION

Although these ink compositions described in the above Patent Publications certainly have improved pigment dispersion stability compared with conventional compositions due to the function of the dispersant, the pigment used is not made sufficiently fine, and there is still room for improvement in terms of an effect in enhancing the dispersibility of finer pigment particles. Furthermore, there is the problem that the dispersion stability is not sufficient over the long term or when there are repeated temperature changes. Furthermore, radically polymerizable ink compositions employing these dispersants have the problems that curability when photocuring and storage stability are insufficient.

The present invention has been carried out in order to solve the various conventional problems and attain the objects below. That is, it is an object of the present invention to provide an ink composition suitable for inkjet recording, the ink composition enabling a high quality image to be formed with a fine pigment that has excellent dispersibility and stability and being capable of curing upon exposure to actinic radiation with high sensitivity, and to provide an inkjet recording method employing the ink composition. It is another object of the present invention to provide a printed material obtained using the ink composition.

The objects of the present invention have been attained by means described in (1), (13), and (14). (2) to (12), which are preferred embodiments, are also shown below.

(1) An ink composition comprising (A) at least one polymerizable compound selected from the group consisting of a monofunctional radically polymerizable monomer having an aliphatic cyclic structure, an N-vinyllactam, and an aromatic monofunctional radically polymerizable monomer, (B) a radical polymerization initiator, (C) a pigment; and (D) a graft copolymer having a repeating unit represented by Formula (D1) in a graft chain

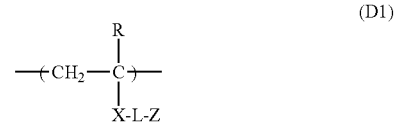

(in Formula (D1), R denotes a hydrogen atom or a methyl group, X denotes a single bond, —O—, —CO—, —COO—, —CONR$^1$—, —OCO—, or a phenylene group, R$^1$ denotes a hydrogen atom, an alkyl group, an aryl group, or an aralkyl group, L denotes a single bond or a divalent linking group, Z denotes —NR$^2$R$^3$, R$^2$ and R$^3$ independently denote a hydrogen atom, an alkyl group, an aryl group, or an aralkyl group, and R² and R³ may be bonded to each other to form a ring), (2) the ink composition according to (1) above, wherein the N-vinyllactam is N-vinylcaprolactam, (3) the ink composition according to (1) or (2) above, wherein the monofunctional radically polymerizable monomer having an aliphatic cyclic structure is represented by Formula (A2)

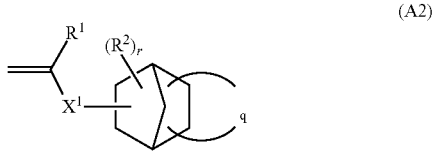

(in Formula (A2), R¹ denotes a hydrogen atom, a halogen atom, or an alkyl group having 1 to 4 carbons, X¹ denotes a divalent linking group, R² denotes a substituent, r denotes an integer of 0 to 5, q denotes a cyclic hydrocarbon structure, the cyclic hydrocarbon structure may comprise a carbonyl bond (—C(O)—) and/or an ester bond (—C(O)O—) in addition to a hydrocarbon bond, the r R²s may be identical to or different from each other, and one carbon atom in the norbornane skeleton may be replaced by an ether bond (—O—) and/or an ester bond (—C(O)O—)), (4) the ink composition according to (3) above, wherein the compound represented by Formula (A2) is a compound represented by Formula (A3) or Formula (A4)

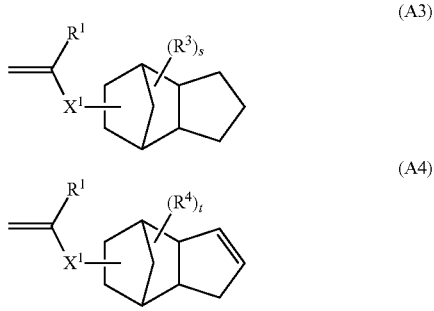

(in Formula (A3) and Formula (A4), R¹ denotes a hydrogen atom, a halogen atom, or an alkyl group having 1 to 4 carbons, X¹ denotes a divalent linking group, R³ and R⁴ independently denote a substituent, s and t independently denote an integer of 0 to 5, and the s R³s and the t R⁴s may be identical to or different from each other), (5) the ink composition according to any one of (1) to (4) above, wherein the aromatic monofunctional radically polymerizable monomer is represented by Formula (A5)

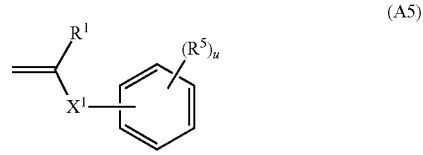

(in Formula (A5), R¹ denotes a hydrogen atom, a halogen atom, or an alkyl group having 1 to 4 carbons, X¹ denotes a divalent linking group, R⁵ denotes a substituent, u denotes an integer of 0 to 5, the u R⁵s may be identical to or different from each other, and the plurality of R⁵s may be bonded to each other to form a ring, which may be an aromatic ring), (6) the ink composition according to any one of (1) to (5) above, wherein the polymerizable compound (A) comprises an N-vinyllactam and further comprises a monofunctional radically polymerizable monomer having an aliphatic cyclic structure and/or an aromatic monofunctional radically polymerizable monomer, (7) the ink composition according to (6) above, wherein it comprises 10 to 35 wt %, relative to the total ink composition, of the N-vinyllactam, and the monofunctional radically polymerizable monomer having an aliphatic cyclic structure and/or the aromatic monofunctional radically polymerizable monomer at 30 to 60 wt % of the total ink composition, (8) the ink composition according to any one of (1) to (7) above, wherein the radical polymerization initiator (B) comprises an acylphosphine oxide compound, (9) the ink composition according to any one of (1) to (8) above, wherein the graft copolymer (D) comprises 2 to 50 wt % of the graft chain having the repeating unit of Formula (D1),

(10) the ink composition according to any one of (1) to (9) above, wherein the graft copolymer (D) comprises a constituent repeating unit represented by Formula (D2)

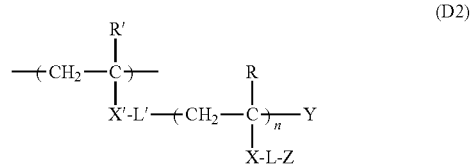

(in Formula (D2), R and R' independently denote a hydrogen atom or a methyl group, X and X' independently denote a single bond, —O—, —CO—, —COO—, —CONR⁵—, —OCO—, or a phenylene group, R⁵ denotes a hydrogen atom, an alkyl group, an aryl group, or an aralkyl group, L and L' independently denote a single bond or a divalent linking group, Y denotes a termination end of a vinyl polymer, Z denotes —NR⁶R⁷, R⁶ and R⁷ independently denote a hydrogen atom, an alkyl group, an aryl group, or an aralkyl group, and R⁶ and R⁷ may be bonded to each other to form a ring),

(11) the ink composition according to any one of (1) to (10) above, wherein the graft copolymer (D) further comprises a graft chain that does not have an amino group,

(12) the ink composition according to any one of (1) to (11) above, wherein it has a viscosity at 25° C. of no greater than 40 mPa·s,

(13) an inkjet recording method comprising (a¹) a step of discharging the ink composition according to any one of (1) to (12) above onto a recording medium, and (b¹) a step of curing the ink composition by irradiating the discharged ink composition with actinic radiation, and

(14) a printed material recorded by the inkjet recording method according to (13) above.

DETAILED DESCRIPTION OF THE INVENTION (1) Ink Composition

The ink composition of the present invention comprises (A) at least one polymerizable compound selected from the group consisting of a monofunctional radically polymerizable monomer having an aliphatic cyclic structure, an N-vinyllactam, and an aromatic monofunctional radically polymerizable monomer, (B) a radical polymerization initiator, (C) a pigment, and (D) a graft copolymer having a repeating unit represented by Formula (D1) in a graft chain (hereinafter, also called '(D) a specific polymer'). Furthermore, the ink composition of the present invention may comprise, in addition to the components above, a sensitizer, a cosensitizer, a polymerizable compound other than the monofunctional radically polymerizable monomer having an aliphatic cyclic structure, the N-vinyllactam, and the aromatic monofunctional radically polymerizable monomer, etc.

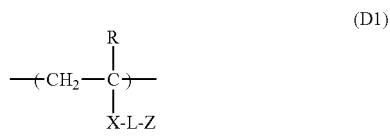

(In Formula (D1), R denotes a hydrogen atom or a methyl group, X denotes a single bond, —O—, —CO—, —COO—, —CONR$^1$—, —OCO—, or a phenylene group, R$^1$ denotes a hydrogen atom, an alkyl group, an aryl group, or an aralkyl group, L denotes a single bond or a divalent linking group, Z denotes —NR$^2$R$^3$, R$^2$ and R$^3$ independently denote a hydrogen atom, an alkyl group, an aryl group, or an aralkyl group, and R$^2$ and R$^3$ may be bonded to each other to form a ring.)

In the present invention, the ink composition can cure upon exposure to actinic radiation.

The 'actinic radiation' referred to in the present invention is not particularly limited as long as it is actinic radiation that can provide energy that enables an initiating species to be generated in the ink composition when irradiated, and broadly includes α rays, γ rays, X rays, ultraviolet rays (UV), visible light, and an electron beam; among these, ultraviolet rays and an electron beam are preferable from the viewpoint of curing sensitivity and the availability of equipment, and ultraviolet rays are particularly preferable. In the present invention, the ink composition is therefore preferably an ink composition that can cure upon exposure to ultraviolet rays as radiation.

Each component is explained below.

(A) Polymerizable Compound

In the present invention, the ink composition comprises as a polymerizable compound at least one compound selected from the group consisting of a monofunctional radically polymerizable monomer having an aliphatic cyclic structure, an N-vinyllactam, and an aromatic monofunctional radically polymerizable monomer. The ink composition of the present invention may use as the polymerizable compound another polymerizable compound in combination.

Monofunctional Radically Polymerizable Monomer having Aliphatic Cyclic Structure and Aromatic Monofunctional Radically Polymerizable Monomer The monofunctional radically polymerizable monomer having an aliphatic cyclic structure and the aromatic monofunctional radically polymerizable monomer are preferably monofunctional radically polymerizable monomers represented by Formula (A1) below. The monofunctional radically polymerizable monomer having an aliphatic cyclic structure is a monofunctional radically polymerizable monomer having an alicyclic hydrocarbon group that may contain a heteroatom, and the aromatic monofunctional radically polymerizable monomer is a monofunctional radically polymerizable monomer having an aromatic group. Furthermore, the monofunctional radically polymerizable monomer is a monomer having only one polymerizable ethylenically unsaturated bond, and preferred examples of a group having a polymerizable ethylenically unsaturated bond include an acryloyloxy group, a methacryloyloxy group, an acrylamide group, a methacrylamide group, a vinyl group, and a vinyloxy group.

In the present invention, the radically polymerizable monomer having an aliphatic cyclic structure has a radically polymerizable group in addition to the aliphatic cyclic structure, and an ethylenically unsaturated bond present within the aliphatic cyclic structure does not correspond to the polymerizable ethylenically unsaturated bond.

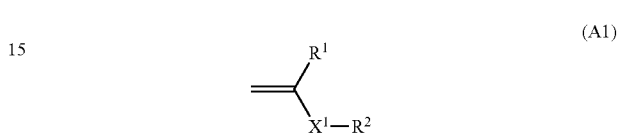

In Formula (A1) above, R$^1$ denotes a hydrogen atom, a halogen atom, or an alkyl group having 1 to 4 carbons, X$^1$ denotes a single bond, an ether bond (—O—), an ester bond (—C(O)O— or —OC(O)—), an amide bond (—C(O)NH— or —NHC(O)—), a carbonyl bond (—C(O)—), an optionally branched alkylene group having no greater than 20 carbons, or a second divalent linking group in which a combination thereof are bonded, and it is preferable for X$^1$ to be the first divalent linking group alone or one having an ether bond, an ester bond, and/or an alkylene group having no greater than 20 carbons when it has the second divalent linking group.

R$^2$ is an aromatic group such as a monocyclic aromatic group or a polycyclic aromatic group, or an alicyclic hydrocarbon group; the aromatic group and the alicyclic hydrocarbon group may have a halogen atom, a hydroxyl group, an amino group, a siloxane group, or a substituent having no greater than 30 carbons, and the ring structure of the aromatic group and the alicyclic hydrocarbon group may contain a heteroatom such as O, N, or S.

In Formula (A1) above, R$^1$ is preferably a hydrogen atom or an alkyl group having 1 to 4 carbons, more preferably a hydrogen atom or a methyl group, and particularly preferably a hydrogen atom.

Furthermore, X$^1$ is preferably one having an ester bond (—C(O)O—).

That is, in the present invention, the monofunctional radically polymerizable monomer having an aliphatic cyclic structure and the aromatic monofunctional radically polymerizable monomer are preferably an acrylate (acrylic acid ester) or a methacrylate (methacrylic acid ester).

Monofunctional Radically Polymerizable Monomer Having Aliphatic Cyclic Structure In the present invention, the monofunctional radically polymerizable monomer having an aliphatic cyclic structure means a monofunctional radically polymerizable monomer having an aliphatic cyclic structure other than an N-vinyllactam.

R$^2$ of Formula (A1) may be an alicyclic hydrocarbon group. Furthermore, it may be a group having an alicyclic hydrocarbon group containing a heteroatom such as O, N, or S.

The alicyclic hydrocarbon group may be a group having a cycloalkane with 3 to 12 carbons.

Specific examples of the alicyclic hydrocarbon group containing a heteroatom such as O, N, or S include groups formed by removing at least one hydrogen from pyrrolidine, pyrazolidine, imidazolidine, isooxazolidine, isothiazolidine, piperidine, piperazine, morpholine, thiomorpholine, diazole, triazole, and tetrazole.

The alicyclic hydrocarbon group and the heterocycle-containing alicyclic hydrocarbon group may have a substituent, and the substituent is preferably a halogen atom, a hydroxyl group, an amino group, a thiol group, a siloxane group, an optionally substituted hydrocarbon group or a heterocyclic group containing a heteroatom such as O, N, or S having a total of no greater than 30 carbons, or an oxy group (=O) as a divalent substituent.

The monofunctional radically polymerizable monomer having an aliphatic cyclic structure is preferably a compound having a norbornane skeleton represented by Formula (A2) below.

(A2)

In Formula (A2) it is preferable that $R^1$ denotes a hydrogen atom, a halogen atom, or an alkyl group having 1 to 4 carbons, and $X^1$ denotes a divalent linking group, and preferably an ether group (—O—), an ester group (—O(O)O— or —OC(O)—), an amide group (—C(O)NR'—), a carbonyl group (—C(O)—), an imino group (—NR'—), an optionally substituted alkylene group having 1 to 15 carbons, or a divalent group in which two or more thereof are combined. R' denotes a hydrogen atom, a straight-chain, branched, or cyclic alkyl group having 1 to 20 carbons, or an aryl group having 6 to 20 carbons. $R^2$ denotes a substituent, r denotes an integer of 0 to 5, q denotes a cyclic hydrocarbon structure, the cyclic hydrocarbon structure may comprise a carbonyl bond (—O(O)—) and/or an ester bond (—O(O)O—) in addition to a hydrocarbon bond, the r $R^2$s may be identical to or different from each other, and one carbon atom in the norbornane skeleton may be replaced by an ether bond (—O—) and/or an ester bond (—C(O)O—).

In Formula (A2), $R^1$ is preferably a hydrogen atom or an alkyl group having 1 to 4 carbons, and more preferably a hydrogen atom or a methyl group.

The end of $X^1$ in Formula (A2) that is bonded to the vinyl group is preferably an ester group or an amide group via which a carbonyl carbon of $X^1$ is bonded to the vinyl group, and is more preferably an ester bond. One having the structure $H_2O=C(R^1)$—C(O)O— is particularly preferable. In this case, another moiety of $X^1$ that is bonded to the norbornane skeleton may be a single bond or one freely selected from the groups above.

The vinyl moiety containing $R^1$ and $X^1$ ($H_2C=C(R^1)$—$X^1$—) may be bonded to any position of the alicyclic hydrocarbon structure. The 'alicyclic hydrocarbon structure' means the norbornane structure and the cyclic hydrocarbon structure comprising q of Formula (A2).

From the viewpoint of improving affinity with a colorant, the end of $X^1$ bonded to the alicyclic hydrocarbon structure in Formula (A2) is preferably an oxygen atom, and more preferably an ethereal oxygen atom, and $X^1$ in Formula (A2) is yet more preferably —C(O)O(CH$_2$CH$_2$O)$_p$— (p denotes 1 or 2).

That is, $X^1$ in Formula (A2) is preferably *—C(O)O(LO)$_q$— or *—C(O)NH(LO)$_q$—. Here, * denotes the position at which $X^1$ and the vinyl group in Formula (A2) are bonded, q is an integer of 0 to 10, and L denotes an alkylene group having 2 to 4 carbons. Among them, $X^1$ is preferably *—C(O)O(LO)$_q$—, and q is preferably an integer of 0 to 4, more preferably an integer of 0 to 2, and yet more preferably 1 or 2. L preferably has 2 or 3 carbons, that is, LO is preferably an ethylene oxide chain or a propylene oxide chain.

The $R^2$s in Formula (A2) independently denote a substituent that may be bonded to any position on the alicyclic hydrocarbon structure. Furthermore, the r $R^2$s may be identical to or different from each other.

The r $R^2$s may independently be a monovalent or polyvalent substituent; the monovalent substituent is preferably a hydroxyl group, a substituted or unsubstituted amino group, a thiol group, a siloxane group, or an optionally substituted hydrocarbon group or heterocyclic group having a total of no greater than 30 carbons, and a divalent substituent is preferably an oxy group (=O).

The substitution number r for $R^2$ denotes an integer of 0 to 5.

q in Formula (A2) denotes a cyclic hydrocarbon structure whose opposite termini may substitute any positions of the norbornane skeleton; it may be a monocyclic structure or a polycyclic structure, and it may contain a carbonyl bond (—C(O)—) and/or an ester bond (—C(O)O—) as well as the hydrocarbon bonds in the cyclic hydrocarbon structure.

The monomer represented by Formula (A2) above is preferably a monomer represented by Formula (A3) or Formula (A4). The unsaturated bond in the cyclic hydrocarbon structure of Formula (A4) has low radical polymerizability, and in the present invention a compound represented by Formula (A4) is considered as a monofunctional radically polymerizable monomer.

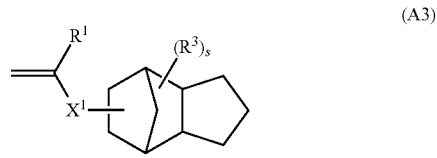

(A3)

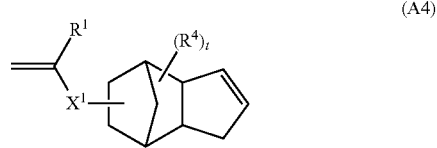

(A4)

In Formula (A3) and Formula (A4), $R^1$ denotes a hydrogen atom, a halogen atom, or an alkyl group having 1 to 4 carbons, $X^1$ denotes a divalent linking group, $R^3$ and $R^4$ independently denote a substituent, s and t independently denote an integer of 0 to 5, and the s $R^3$s and the t $R^4$s may be identical to or different from each other.

$R^1$ and $X^1$ in Formula (A3) or Formula (A4) have the same meanings as those of $R^1$ and $X^1$ in Formula (A2) and preferred ranges are also the same.

The vinyl moiety containing $R^1$ and $X^1$ in Formula (A3) or Formula (A4) may be bonded to any position on the alicyclic hydrocarbon structures in Formula (A3) and Formula (A4) below.

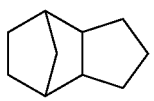 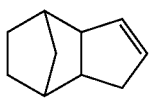

$R^3$ and $R^4$ in Formula (A3) and Formula (A4) independently denote a substituent, and it may be bonded to any position on the alicyclic hydrocarbon structures in Formula (A3) and Formula (A4). The substituent denoted by $R^3$ or $R^4$ has the same meaning as that of the substituent denoted by $R^2$ in Formula (A2), and a preferred range is also the same.

s and t in Formula (A3) or Formula (A4) independently denote an integer of 0 to 5, and the s $R^3$s and the t $R^4$s may be identical to or different from each other.

Preferred specific examples of monofunctional acrylates as the monomer represented by Formula (A2) are shown below.

In some of the compound examples below, a hydrocarbon chain is represented by a simplified structural formula in which symbols for carbon (C) and hydrogen (H) are omitted.

(M-10)

(M-11)

(M-12)

(M-13)

(M-14)

(M-20)

(M-22)

(M-23)

(M-25)

Preferred specific examples of monofunctional methacrylates as the monomer represented by Formula (A2) are shown below.

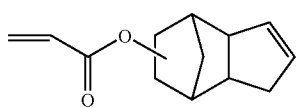
(M-29)

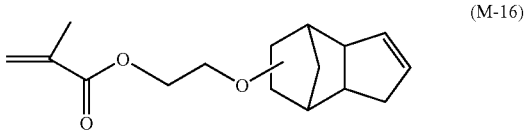
(M-16)

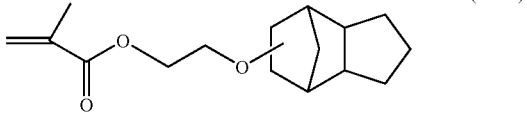
(M-17)

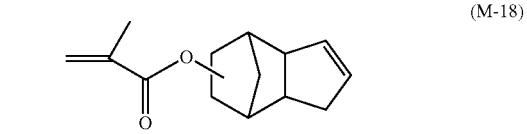
(M-18)

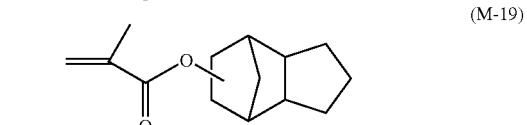
(M-19)

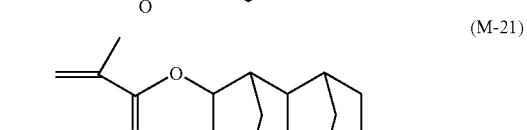
(M-21)

A preferred specific example of a monofunctional acrylamide as the monomer represented by Formula (A2) is shown below.

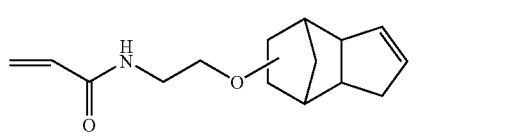
(M-15)

Aromatic Monofunctional Radically Polymerizable Monomer

The aromatic monofunctional radically polymerizable monomer is preferably a polymerizable monomer represented by Formula (A5) below.

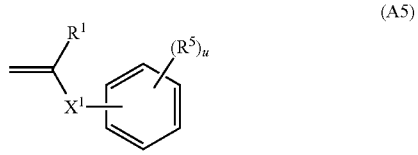
(A5)

(In Formula (A5), $R^1$ denotes a hydrogen atom, a halogen atom, or an alkyl group having 1 to 4 carbons, $X^1$ denotes a divalent linking group, $R^5$ denotes a substituent, u denotes an integer of 0 to 5, the u $R^5$s may be identical to or different from each other, the plurality of $R^5$s may be bonded to each other to form a ring, and the ring may be an aromatic ring.)

In Formula (A5), $R^1$ is preferably a hydrogen atom or an alkyl group having 1 to 4 carbons, more preferably a hydrogen atom or a methyl group, and yet more preferably a hydrogen atom.

$X^1$ has the same meaning as that of $X^1$ in Formula (A2), and a preferred range is also the same.

The u $R^5$s may independently be a monovalent or polyvalent substituent, and the monovalent substituent is preferably a hydroxyl group, a substituted or unsubstituted amino group, thiol group, or siloxane group, or an optionally substituted hydrocarbon group or heterocyclic group having a total number of carbons of no greater than 30.

In Formula (A5), the plurality of $R^5$s preferably form an aromatic ring when they are bonded to each other to form a ring.

That is, in Formula (A5), the aromatic group is preferably a group (a phenyl group, a phenylene group, etc.) in which at least one hydrogen is removed from benzene, which is a monocyclic aromatic group, or a polycyclic aromatic group having 2 to 4 rings, but is not limited thereto. Specific examples thereof include a group in which at least one hydrogen atom is removed from naphthalene, anthracene, 1H-indene, 9H-fluorene, 1H-phenalene, phenanthrene, triphenylene, pyrene, naphthacene, tetraphenylene, biphenylene, as-indacene, s-indacene, acenaphthylene, fluoranthene, acephenanthrylene, aceanthrylene, chrysene, or pleiadene.

These aromatic groups may be aromatic heterocyclic groups containing a heteroatom such as O, N, or S. Specific examples thereof include a group in which at least one hydrogen atom is removed from a monocyclic aromatic heterocyclic compound such as furan, thiophene, 1H-pyrrole, 2H-pyrrole, 1H-pyrazole, 1H-imidazole, isoxazole, isothiazole, 2H-pyran, 2H-thiopyran, pyridine, pyridazine, pyrimidine, pyrazine, 1,2,3-triazole, or 1,2,4-triazole.

Furthermore, examples include a group in which at least one hydrogen atom is removed from a polycyclic aromatic heterocyclic compound such as thianthrene, isobenzofuran, isochromene, 4H-chromene, xanthene, phenoxathiine, indolizine, isoindole, indole, indazole, purine, 4H-quinolizine, isoquinoline, quinoline, phthalazine, naphthyridine, quinoxaline, quinazoline, cinnoline, pteridine, carbazole, β-carboline, phenanthridine, acridine, perimidine, phenanthroline, phenazine, phenothiazine, phenoxazine, or pyrrolidine.

These aromatic groups may have one or more halogen atom, hydroxyl group, amino group, thiol group, siloxane group, or substituent having no greater than 30 carbons. A cyclic structure containing a heteroatom such as O, N, or S may be formed from two or more substituents possessed by the aromatic group as in, for example, phthalic anhydride or phthalimide.

In the present invention, the polycyclic aromatic group is more preferably a polycyclic aromatic group having 2 to 3 rings, and is particularly preferably a naphthyl group.

Preferred specific examples of the aromatic monofunctional radically polymerizable monomer include, but are not limited to, [L-1] to [L-68] below.

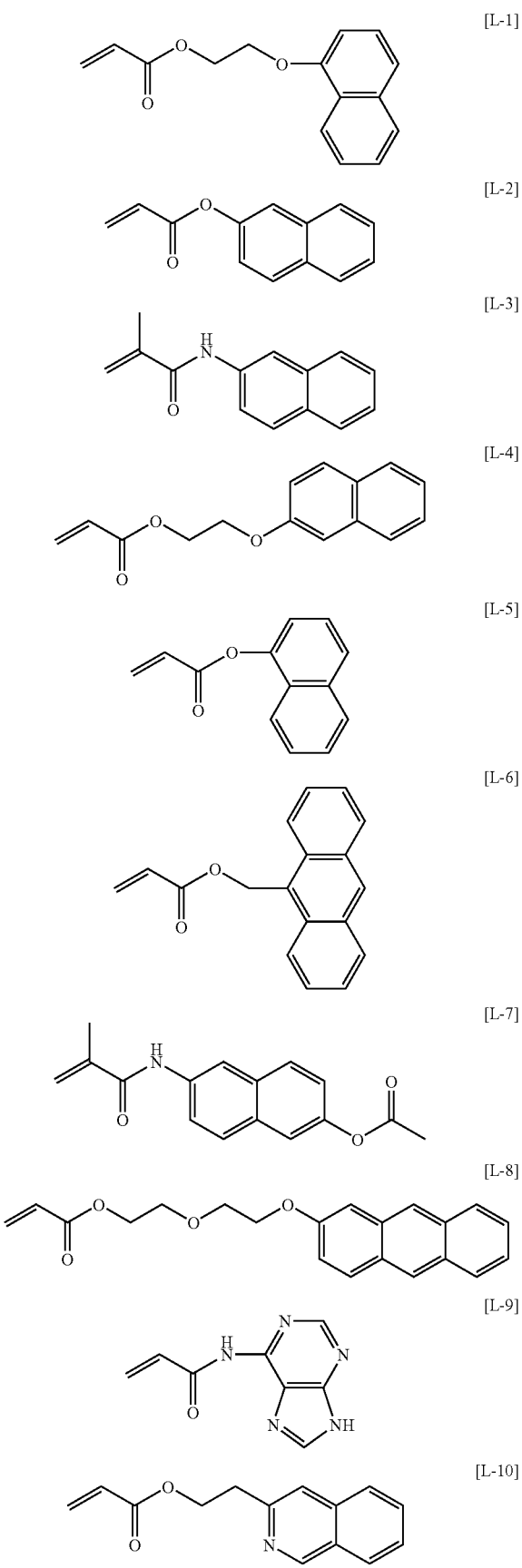

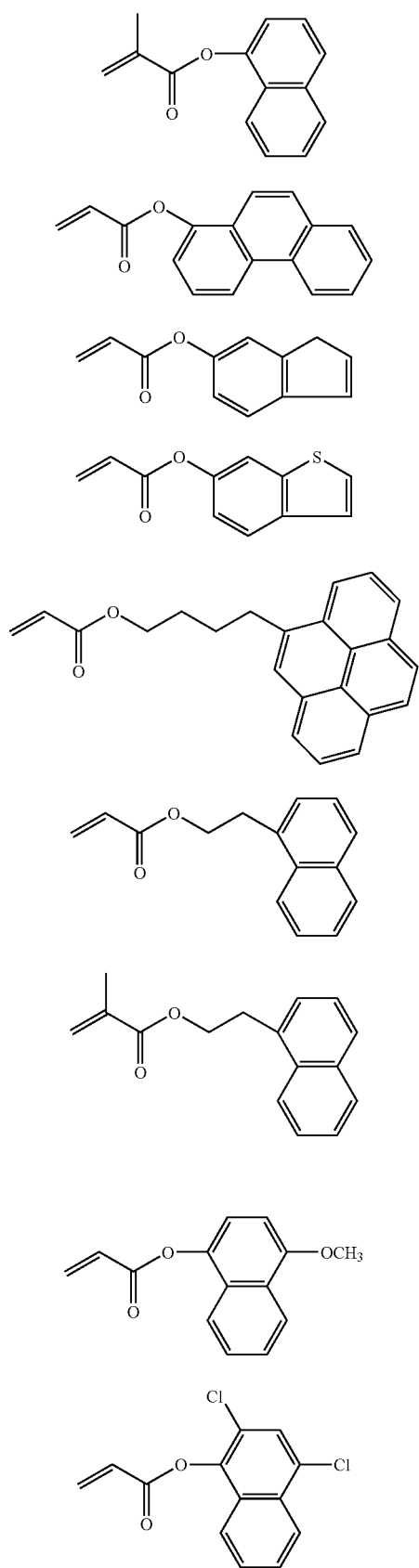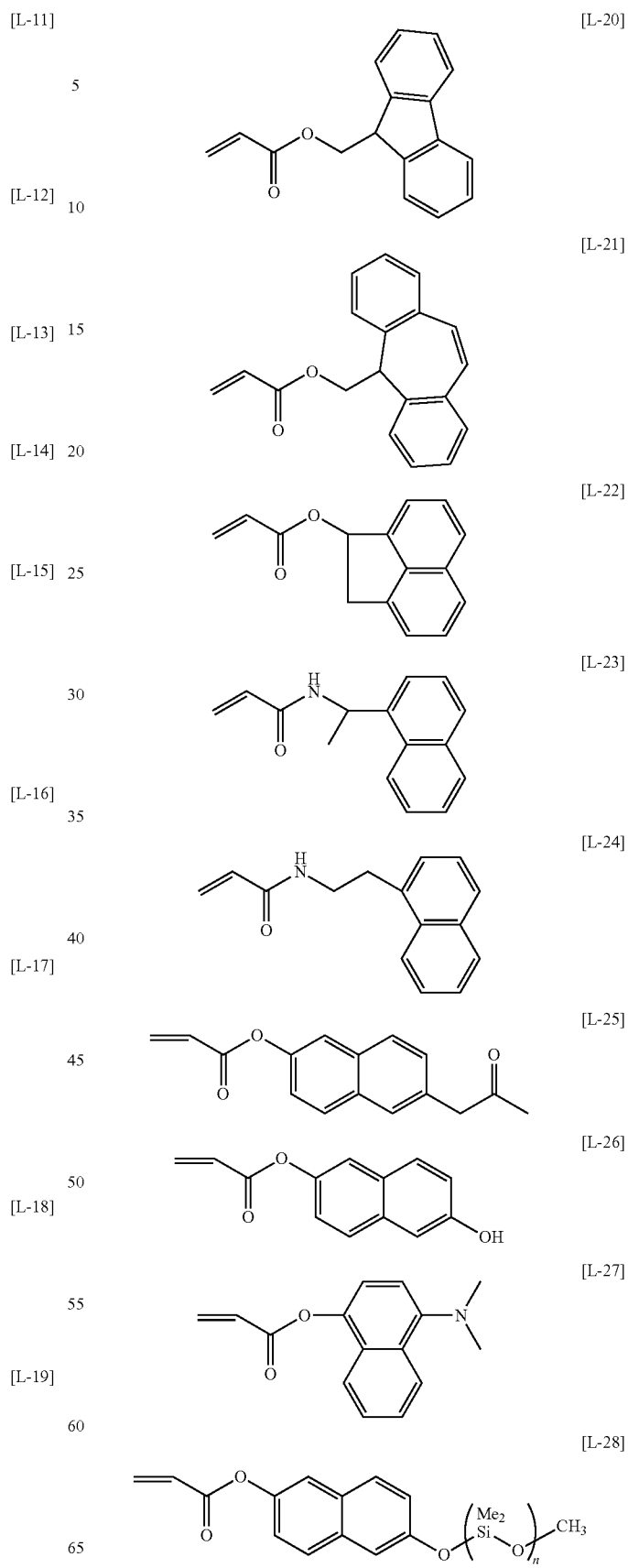

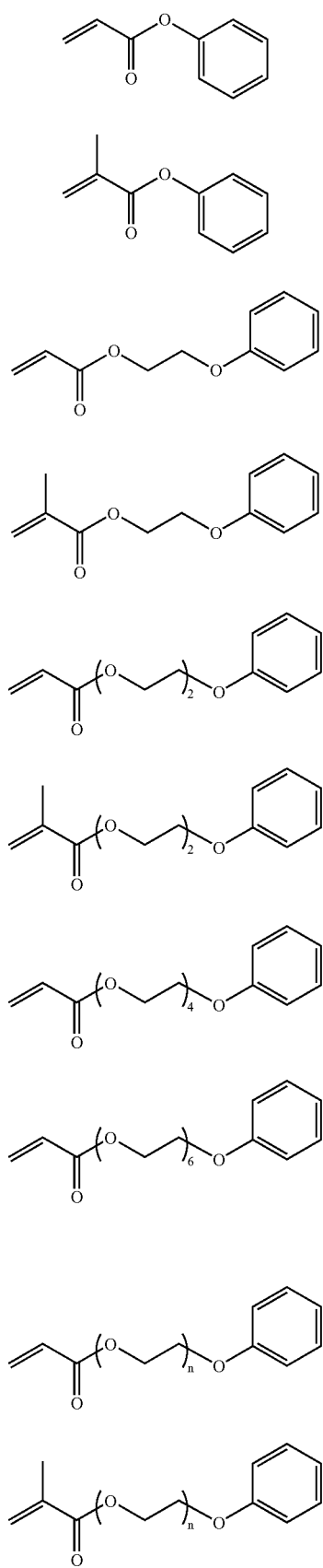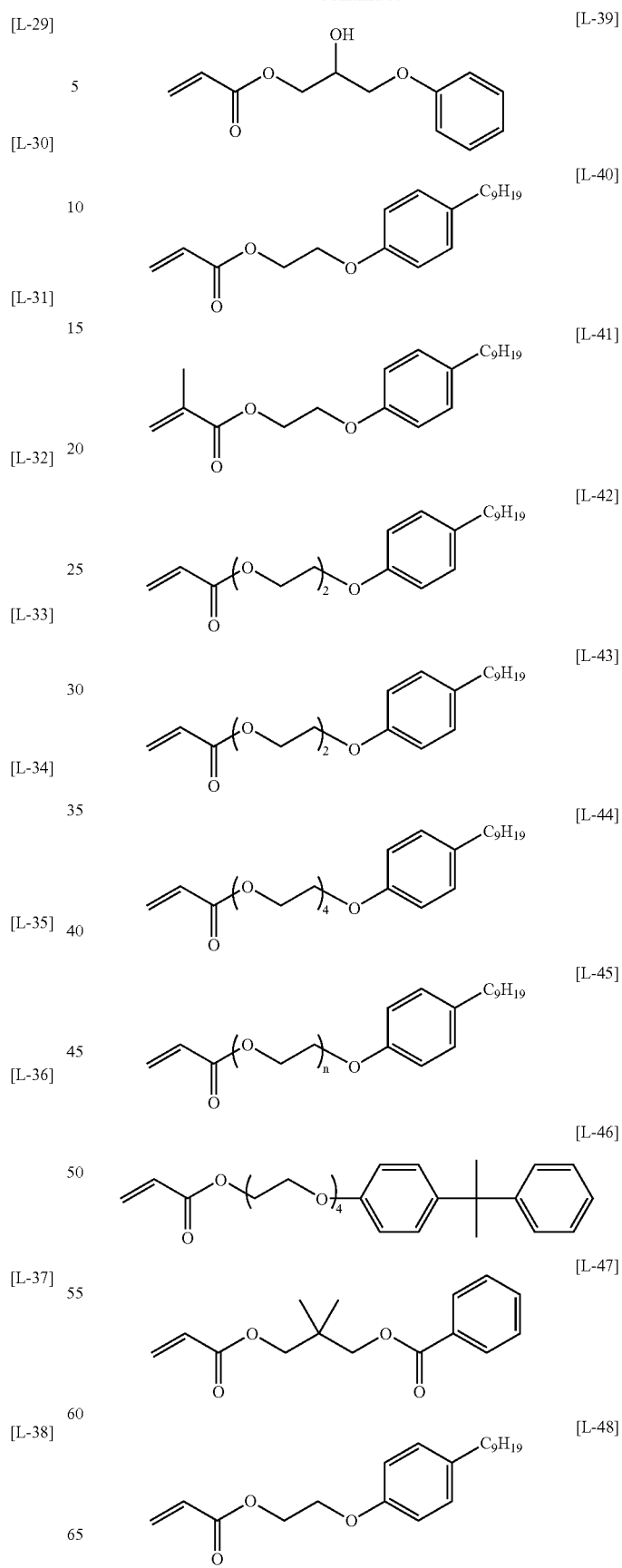

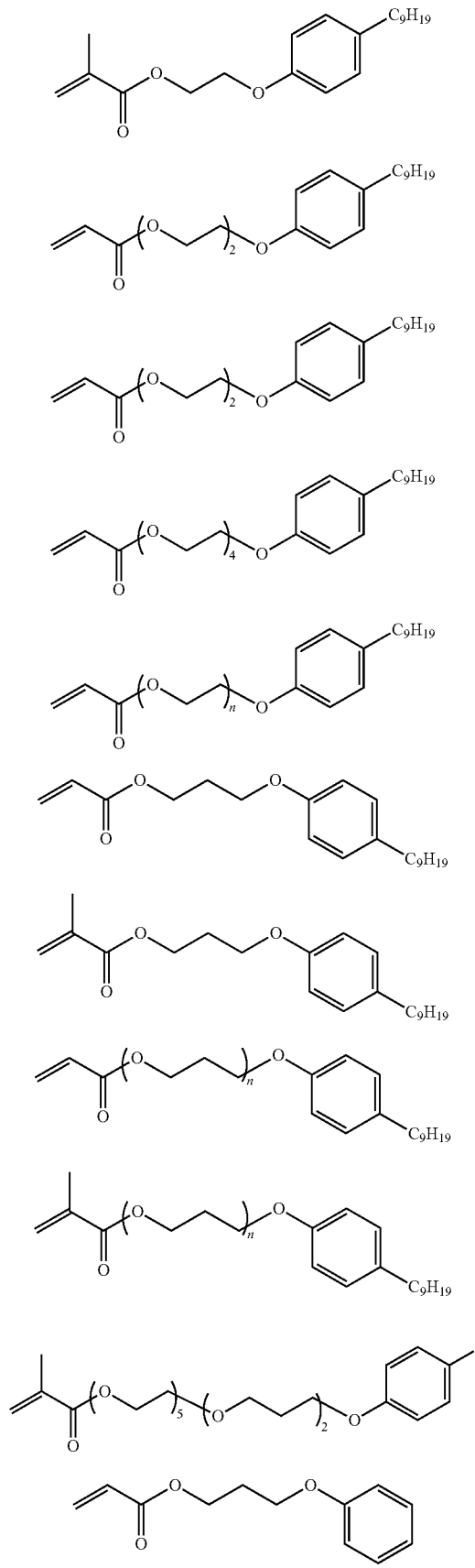
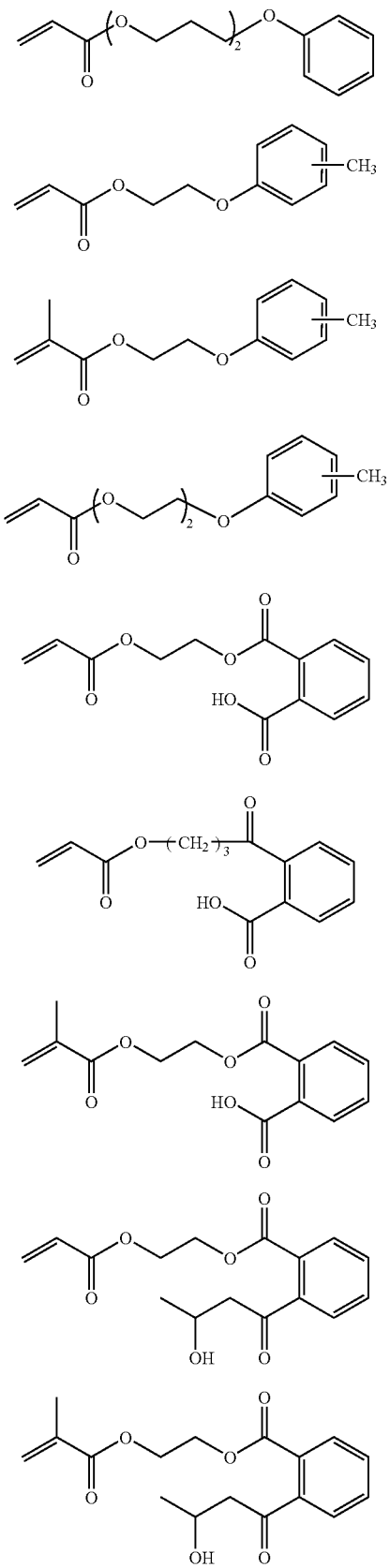

(A) N-Vinyllactam

In the present invention, it is preferable to use an N-vinyllactam as the polymerizable compound. Preferred examples of the N-vinyllactam that can be used in the present invention include compounds represented by Formula (A6) below.

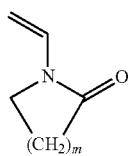

In Formula (A6), m denotes an integer of 1 to 5; m is preferably an integer of 2 to 4 from the viewpoint of flexibility after the ink composition is cured, adhesion to a recording medium, and ease of availability of starting material, m is more preferably an integer of 2 or 4, and m is particularly preferably 4, which is N-vinylcaprolactam. N-vinylcaprolactam is preferable since it has excellent safety, is commonly used and easily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded thereto. The N-vinyllactam may be contained in the ink composition singly or in a combination of a plurality of types thereof.

In the present invention, it is preferable that an N-vinyllactam is contained at 5 wt % to 40 wt % of the total ink composition, more preferably 8 wt % to 35 wt %, and yet more preferably 10 wt % to 30 wt %. It is preferable for it to be in the above range since it shows good copolymerizability with another polymerizable compound, and an ink composition having excellent curability and blocking resistance is obtained.

In the present invention, it is preferable that at least an N-vinyllactam is contained as a polymerizable compound and, in addition, a monofunctional radically polymerizable monomer having an aliphatic cyclic structure and/or an aromatic monofunctional radically polymerizable monomer are contained as polymerizable compounds.

In this case, the N-vinyllactam is preferably contained at 5 to 50 wt % of the total ink composition, more preferably 8 to 40 wt %, and yet more preferably 10 to 35 wt %. Furthermore, the monofunctional radically polymerizable monomer having an aliphatic cyclic structure and/or the aromatic monofunctional radically polymerizable monomer are preferably contained at 20 to 80 wt % of the total ink composition, more preferably 25 to 70 wt %, and yet more preferably 30 to 60 wt %.

The total amount of the N-vinyllactam, the monofunctional radically polymerizable monomer having an aliphatic cyclic structure, and the aromatic monofunctional radically polymerizable monomer is preferably at least 20 wt % of the total polymerizable compounds, more preferably at least 40 wt %, and yet more preferably at least 60 wt %.

It is preferable for the content in the ink composition to be in the above range since an ink composition having low viscosity and good curability is obtained. Furthermore, a cured film formed by curing the ink composition has a non-tacky surface and has excellent flexibility.

Other Polymerizable Compound

An acyclic monofunctional monomer described below may be used as a polymerizable compound in combination. The acyclic monofunctional monomer has relatively low viscosity and may be used preferably, for example, for the purpose of decreasing the viscosity of the ink composition. However, from the viewpoint of suppressing stickiness of a cured film and giving a high film strength so that scratches, etc. do not occur, the proportion of the acyclic monofunctional monomer below in the total ink composition is preferably no greater than 20 wt %, and more preferably no greater than 15 wt %.

Specific examples thereof include octyl (meth)acrylate, 2-ethylhexyl (meth)acrylate, decyl (meth)acrylate, dodecyl (meth)acrylate, tridecyl (meth)acrylate, tetradecyl (meth)acrylate, hexadecyl (meth)acrylate, 2-hydroxyethyl (meth)acrylate, butoxyethyl (meth)acrylate, carbitol (meth)acrylate, 2-ethylhexyl diglycol (meth)acrylate, polyethylene glycol (meth)acrylate monomethyl ether, polypropylene glycol (meth)acrylate monomethyl ether, and polytetraethylene glycol (meth)acrylate monomethyl ether.

Furthermore, preferred examples of the polymerizable compound having a radically polymerizable ethylenically unsaturated bond include unsaturated carboxylic acids such as acrylic acid, methacrylic acid, itaconic acid, crotonic acid, isocrotonic acid, and maleic acid and salts thereof, anhydrides having an ethylenically unsaturated group, acrylonitrile, various types of unsaturated polyester, unsaturated polyether, and unsaturated polyamide, unsaturated urethane (meth)acrylic monomer or prepolymer, an epoxy-based monomer or prepolymer, or urethane-based monomer or prepolymer.

Specific examples of the monofunctional (meth)acrylic acid esters include (poly)ethylene glycol mono(meth)acrylate, (poly)ethylene glycol (meth)acrylate methyl ester, (poly)ethylene glycol (meth)acrylate ethyl ester, (poly)propylene glycol mono(meth)acrylate, (poly)propylene glycol (meth)acrylate methyl ester, (poly)propylene glycol (meth)acrylate ethyl ester, acrylic acid derivatives such as 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, 2-hydroxyethyl acrylate, butoxyethyl acrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylolacrylamide, diacetoneacrylamide, and epoxy acrylate, methacrylic derivatives such as methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, allyl methacrylate, glycidyl methacrylate, and dimethylaminomethyl methacrylate, other allyl compound derivatives such as allyl glycidyl ether, 2-ethylhexyldiglycol acrylate, 2-hydroxybutyl acrylate, 2-acryloyloxyethylsuccinic acid, modified glycerol triacrylate, bisphenol A diglycidyl ether acrylic acid adduct, lactone-modified flexible acrylate, methoxydipropylene glycol acrylate and, more specifically, radically polymerizable or crosslinking monomers, oligomers, and polymers that are commercial products or are industrially known, such as those described in 'Kakyozai Handobukku' (Crosslinking Agent Handbook), Ed. S. Yamashita (Taiseisha, 1981); 'UV•EB Koka Handobukku' (UV•EB Curing Handbook) (Starting Materials) Ed. K. Kato (Kobunshi Kankoukai, 1985); 'UV•EB Koka Gijutsu no Oyo to Shijyo' (Application and Market of UV•EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

If necessary, a polyfunctional monomer having two or more ethylenically unsaturated double bond groups selected from the group consisting of an acrylate group, a methacrylate group, an acrylamide group, a methacrylamide group, a vinyloxy group, and an N-vinyl group may additionally be used as a radically polymerizable monomer. Adding a polyfunctional monomer enables an ink composition having high cured film strength to be obtained. From the viewpoint of maintaining adhesion of a cured film to a substrate (recording medium), the proportion of the polyfunctional monomer in the total ink composition is preferably no greater than 50 wt %, and more preferably no greater than 45 wt %.

Specific examples thereof include 1,6-hexanediol di(meth)acrylate, 1,9-nonanediol di(meth)acrylate, 1,10-decanediol di(meth)acrylate, bis(4-acryloxypolyethoxyphenyl)propane, neopentyl glycol di(meth)acrylate, ethoxylated neopentyl glycol diacrylate, propoxylated neopentyl glycol diacrylate, neopentyl glycol hydroxypivalate diacrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, polytetramethylene glycol di(meth)acrylate, pentaerythritol tri(meth)acrylate, ethylene oxide (EO) modified pentaerythritol tri(meth)acrylate, propylene oxide (PO) modified pentaerythritol tri(meth)acrylate, pentaerythritol tetra(meth)acrylate, EO-modified pentaerythritol tetra(meth)acrylate, PO-modified pentaerythritol tetra(meth)acrylate, pentaerythritol tri(meth)acrylate tolylene diisocyanate urethane prepolymer, pentaerythritol tri(meth)acrylate hexamethylene diisocyanate urethane prepolymer, pentaerythritol tri(meth)acrylate hexamethylene diisocyanate urethane prepolymer, dipentaerythritol tetra(meth)acrylate, EO-modified dipentaerythritol tetra(meth)acrylate, PO-modified dipentaerythritol tetra(meth)acrylate, trimethylolethane tri(meth)acrylate, trimethylolpropane tri(meth)acrylate, EO-modified trimethylolpropane tri(meth)acrylate, PO-modified trimethylolpropane tri(meth)acrylate, tetramethylolmethane tetra(meth)acrylate, EO-modified tetramethylolmethane tetra(meth)acrylate, PO-modified tetramethylolmethane tetra(meth)acrylate, tetramethylolmethane tri(meth)acrylate, dimethyloltricyclodecane di(meth)acrylate, ditrimethylolpropane tetra(meth)acrylate, modified glycerol tri(meth)acrylate, modified bisphenol A di(meth)acrylate, bisphenol A PO adduct di(meth)acrylate, bisphenol A EO adduct di(meth)acrylate, dipentaerythritol hexa(meth)acrylate, caprolactone-modified dipentaerythritol hexa(meth)acrylate, 2,2-bis(4-(meth)acryloxypolyethoxyphenyl)propane, diallyl phthalate, and triallyl trimellitate.

It is also preferable to use a vinyl ether compound as a radically polymerizable compound. Examples of vinyl ether compounds that are suitably used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; and monovinyl ether compounds such as ethyl vinyl ether, n-butyl vinyl ether, isobutyl vinyl ether, octadecyl vinyl ether, hydroxybutyl vinyl ether, 2-ethylhexyl vinyl ether, n-propyl vinyl ether, isopropyl vinyl ether, isopropenyl vinyl ether, dodecyl vinyl ether, ethylene glycol monovinyl ether, diethylene glycol monovinyl ether, triethylene glycol monovinyl ether, hydroxyethyl monovinyl ether, hydroxynonyl monovinyl ether, and octadecyl vinyl ether.

Among these vinyl ether compounds, divinyl ether compounds and trivinyl ether compounds are preferable from the viewpoint of curability, adhesion, and surface hardness, and divinyl ether compounds are particularly preferable. The vinyl ether compound may be used singly or in a combination of two or more types as appropriate.

In the present invention, the monomers listed above as the above-mentioned polymerizable compounds have high reactivity, low viscosity, and excellent adhesion to a recording medium.

The polymerizable compound that can be used in the present invention is preferably 40 to 99 wt % relative to the total amount of the ink composition, more preferably 50 to 97 wt %, and yet more preferably 60 to 95 wt %. It is preferable for it to be in the above-mentioned range since the curability is excellent and the viscosity is appropriate.

(B) Polymerization Initiator

In the present invention, as the polymerization initiator (photopolymerization initiator), a known radical polymerization initiator may be used. The polymerization initiator that can be used in the present invention may be used on its own or in a combination of two or more types. Furthermore, the radical polymerization initiator may be used in combination with a cationic polymerization initiator.

It is preferable to use a cationic polymerization initiator when a cationic polymerization compound is used as a polymerizable compound.

The photopolymerization initiator that can be used in the present invention is a compound that forms a polymerization initiating species by irradiation with actinic radiation. Examples of the actinic radiation include γ rays, β rays, an electron beam, UV rays, visible light, and IR rays, and from the viewpoint of equipment cost and operational safety, UV rays and visible light are preferable.

A photopolymerization initiator known to a person skilled in the art may be used without limitation, and many specific examples thereof are described in Bruce M. Monroe et al., Chemical Reviews, 93, 435 (1993), R. S. Davidson, Journal of Photochemistry and Biology A: Chemistry, 73, 81 (1993), J. P. Faussier "Photoinitiated Polymerization-Theory and Applications": Rapra Review, Vol. 9, Report, Rapra Technology (1998), and M. Tsunooka et al., Prog. Polym. Sci., 21, 1 (1996). Furthermore, many compounds utilized in chemically amplified photoresists and cationic photopolymerization, etc. are described in 'Imejingu yo Yukizairyou' (Organic Materials for Imaging) Ed. Japanese Research Association for Organic Electronics Materials, Bunshin Publishing Co. (1993), pp. 187-192. Moreover, a group of compounds are known, as described in F. D. Saeva, Topics in Current Chemistry, 156, 59 (1990), G. G. Maslak, Topics in Current Chemistry, 168, 1 (1993), H. B. Shuster et al., JACS, 112, 6329 (1990), I. D. F. Eaton et al., JACS, 102, 3298 (1980), etc., that cause oxidative or reductive bond cleavage via interaction with an electronic excited state of a sensitizing dye.

In the present invention, it is preferable to use as the photopolymerization initiator an acylphosphine oxide compound. Preferred examples of the acylphosphine oxide compound is as follows.

Acylphosphine Oxide Compound

As the acylphosphine oxide compound, a compound represented by Formula (B1) or Formula (B2) below is preferable.

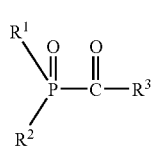
(B1)

R¹ and R² in Formula (B1) above independently denote an aliphatic group, an aromatic group, an aliphatic oxy group, an aromatic oxy group, or a heterocyclic group, and R³ denotes an aliphatic group, an aromatic group, or a heterocyclic group. R¹ and R² above may be bonded to form a 5-membered to 9-membered ring. The ring structure may be a heterocycle having in the ring structure an oxygen atom, a nitrogen atom, a sulfur atom, etc.

Examples of the aliphatic group represented by $R^1$, $R^2$, or $R^3$ above include an alkyl group, a substituted alkyl group, an alkenyl group, a substituted alkenyl group, an alkynyl group, a substituted alkynyl group, an aralkyl group, and a substituted aralkyl group; among them, an alkyl group, a substituted alkyl group, an alkenyl group, a substituted alkenyl group, an aralkyl group, and a substituted aralkyl group are preferable, and an alkyl group and a substituted alkyl group are particularly preferable. Furthermore, the aliphatic group may be a cyclic aliphatic group or an open-chain aliphatic group. The open-chain aliphatic group may be branched.

Examples of the alkyl group include straight chain, branched, and cyclic alkyl groups, and the number of carbons in the alkyl group is preferably at least 1 but no greater than 30, and more preferably at least 1 but no greater than 20. A preferred range for the number of carbons in the alkyl moiety of the substituted alkyl group is the same as for the alkyl group above. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, an cyclopentyl group, a neopentyl group, an isopropyl group, and an isobutyl group.

Examples of the substituent of the substituted alkyl group include —COOH (carboxyl group), —SO₃H (sulfo group), —CN (cyano group), a halogen atom (e.g. a fluorine atom, a chlorine atom, a bromine atom), —OH (hydroxy group), an alkoxycarbonyl group having no greater than 30 carbons (e.g. a methoxycarbonyl group, an ethoxycarbonyl group, a benzyloxycarbonyl group), an alkylsulfonylaminocarbonyl group having no greater than 30 carbons, an arylsulfonylaminocarbonyl group having no greater than 30 carbons, an alkylsulfonyl group having no greater than 30 carbons, an arylsulfonyl group having no greater than 30 carbons, an acylaminosulfonyl group having no greater than 30 carbons, an alkoxy group having no greater than 30 carbons (e.g. a methoxy group, an ethoxy group, a benzyloxy group, a phenoxyethoxy group, a phenethyloxy group), an alkylthio group having no greater than 30 carbons (e.g. a methylthio group, an ethylthio group, a methylthioethylthioethyl group), an aryloxy group having no greater than 30 carbons (e.g. a phenoxy group, a p-tolyloxy group, a 1-naphthoxy group, a 2-naphthoxy group), a nitro group, an alkoxycarbonyloxy group having no greater than 30 carbons, an aryloxycarbonyloxy group having no greater than 30 carbons, an acyloxy group having no greater than 30 carbons (e.g. an acetyloxy group, a propionyloxy group), an acyl group having no greater than 30 carbons (e.g. an acetyl group, a propionyl group, a benzoyl group), a carbamoyl group (e.g. a carbamoyl group, an N,N-dimethylcarbamoyl group, a morpholinocarbonyl group, a piperidinocarbonyl group), a sulfamoyl group (e.g. a sulfamoyl group, an N,N-dimethylsulfamoyl group, a morpholinosulfonyl group, a piperidinosulfonyl group), an aryl group having no greater than 30 carbons (e.g. a phenyl group, a 4-chlorophenyl group, a 4-methylphenyl group, an α-naphthyl group), a substituted amino group (e.g. an amino group, an alkylamino group, a dialkylamino group, an arylamino group, a diarylamino group, an acylamino group), a substituted ureido group, a substituted phosphono group, and a heterocyclic group. Here, the carboxyl group, the sulfo group, the hydroxy group, and the phosphono group may be in the form of a salt. In this case, a cation forming the salt is a group that can form a positive ion, and is preferably an organic cationic compound, a transition metal coordination complex cation (a compound described in Japanese registered patent No. 2791143, etc.), or a metal cation (e.g. $Na^+$, $K^+$, $Li^+$, $Ag^+$, $Fe^{2+}$, $Fe^{3+}$, $Cu^+$, $Cu^{2+}$, $Zn^{2+}$, $Al^{3+}$).

Examples of the alkenyl group include straight chain, branched, and cyclic alkenyl groups, and the number of carbons of the alkenyl group is preferably at least 2 but no greater than 30, and more preferably at least 2 but no greater than 20. Furthermore, the alkenyl group may be an unsubstituted alkenyl group or a substituted alkenyl group having a substituent, and a preferred range for the number of carbons in the alkenyl moiety of the substituted alkenyl group is the same as for the alkenyl group above. Examples of the substituent of the substituted alkenyl group include the same substituents as for the above substituted alkyl group.

Examples of the alkynyl group include straight chain, branched, and cyclic alkynyl groups, and the number of carbons of the alkynyl group is preferably at least 2 but no greater than 30, and more preferably at least 2 but no greater than 20. Furthermore, the alkynyl group may be an unsubstituted alkynyl group or a substituted alkynyl group having a substituent, and a preferred range for the number of carbons in the alkynyl moiety of the substituted alkynyl group is the same as for the alkynyl group above. Examples of the substituent of the substituted alkynyl group include the same substituents as for the above substituted alkyl group.

Examples of the aralkyl group include aralkyl groups having a straight chain, branched, or cyclic alkyl side chain; the number of carbons of the aralkyl group is preferably at least 7 but no greater than 35, and more preferably at least 7 but no greater than 25. Furthermore, the aralkyl group may be an unsubstituted aralkyl group or a substituted aralkyl group having a substituent, and a preferred range for the number of carbons in the aralkyl moiety of the substituted aralkyl group is the same as for the aralkyl group above. Examples of the substituent of the substituted aralkyl group include the same substituents as for the above substituted alkyl group. Furthermore, the aryl moiety of the aralkyl group may have a substituent, and examples of the substituent include the same substituents as for the substituted alkyl group above and straight chain, branched, and cyclic alkyl groups having no greater than 30 carbons.

Examples of the aromatic group represented by $R^1$, $R^2$, or $R^3$ include an aryl group and a substituted aryl group. The number of carbons of the aryl group is preferably at least 6 but no greater than 30, and more preferably at least 6 but no greater than 20. A preferred range for the number of carbons in the aryl moiety of the substituted aryl group is the same as for the aryl group above. Examples of the aryl group include a phenyl group, an α-naphthyl group, and a β-naphthyl group. Examples of the substituent of the substituted aryl group include the same substituents as for the above substituted alkyl group, and straight chain, branched, and cyclic alkyl groups having no greater than 30 carbons.

The aliphatic oxy group represented by $R^1$ or $R^2$ above is preferably an alkoxy group having at least 1 but no greater than 30 carbons, and examples thereof include a methoxy group, an ethoxy group, a butoxy group, an octyloxy group, and a phenoxyethoxy group. However, the examples are not limited thereto.

The aromatic oxy group represented by $R^1$ or $R^2$ above is preferably an aryloxy group having at least 6 but no greater than 30 carbons, and examples thereof include a phenoxy group, a methylphenyloxy group, a chlorophenyloxy group, a methoxyphenyloxy group, and an octyloxyphenyloxy group. However, the examples are not limited thereto.

The heterocyclic group represented by $R^1$, $R^2$, or $R^3$ above is preferably an N, O, or S atom-containing heterocyclic group, and examples thereof include a pyridyl group, a furyl group, a thienyl group, an imidazolyl group, and a pyrrolyl group.

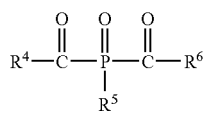
(B2)

$R^4$ and $R^6$ in Formula (B2) above independently denote an alkyl group, an aryl group, or a heterocyclic group, and $R^5$ denotes an alkyl group, an aryl group, an alkoxy group, an aryloxy group, or a heterocyclic group.

The alkyl group, aryl group, heterocyclic group, alkoxy group, and aryloxy group denoted by $R^4$, $R^5$, or $R^6$ may have a substituent, and examples of the substituent include the same substituents as in the case of Formula (B1) above.

The alkyl group, aryl group, heterocyclic group, alkoxy group, and aryloxy group in Formula (B2) above are the same as those in Formula (B1) above.

The compound represented by Formula (B1) above is preferably a compound represented by Formula (B3) below.

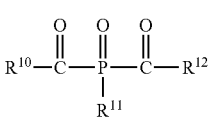
(B3)

In Formula (B3), $R^7$ and $R^8$ independently denote a phenyl group, a methoxy group, or an isopropoxy group, and $R^9$ denotes a 2,4,6-trimethylphenyl group, a 2,4-dimethylphenyl group, a 2-methylphenyl group (o-toluyl group), an isobutyl group, or a t-butyl group.

The compound represented by Formula (B2) above is preferably a compound represented by Formula (B4) below.

(B4)

$$R^{10}-\underset{\underset{R^{11}}{|}}{\overset{O}{\overset{\|}{C}}}-\overset{O}{\overset{\|}{P}}-\overset{O}{\overset{\|}{C}}-R^{12}$$

In Formula (B4), $R^{10}$ and $R^{12}$ independently denote a 2,4,6-trimethylphenyl group, a 2,6-dimethylphenyl group, or a 2,6-dimethoxyphenyl group, and $R^{11}$ denotes a phenyl group or a 2,4,4-trimethylpentyl group.

Examples of the acylphosphine oxide compound represented by Formula (B1) or (B2) above include compounds described in JP-B-63-40799 (JP-B denotes a Japanese examined patent application publication), JP-B-5-29234, JP-A-10-95788, JP-A-10-29997, etc.

Specific examples of the acylphosphine oxide compound include the compounds shown below (compound examples (P-1) to (P-26)), but the present invention is not limited thereto.

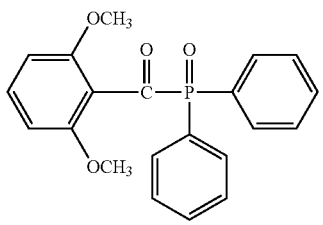
(P-1)

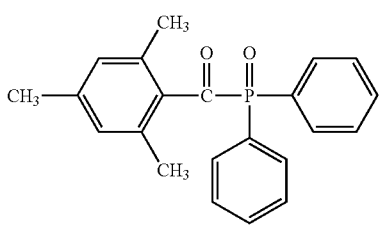
(P-2)

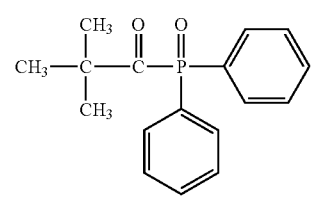
(P-3)

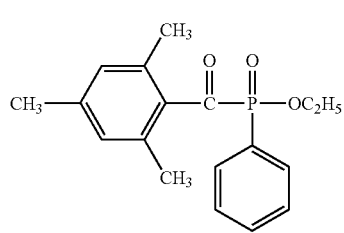
(P-4)

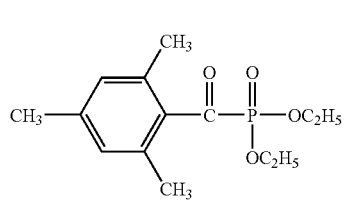
(P-5)

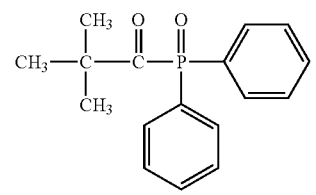
(P-6)

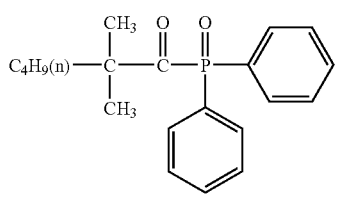 (P-7)
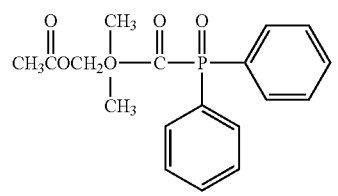 (P-8)
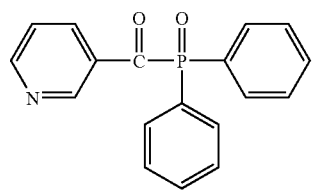 (P-9)
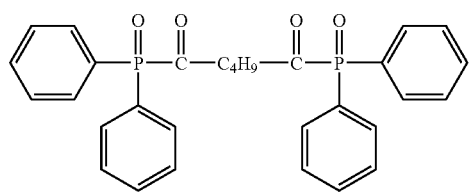 (P-10)
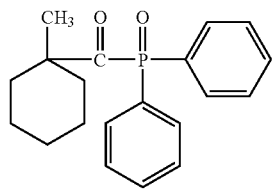 (P-11)
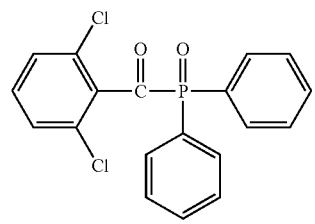 (P-12)
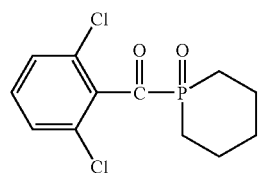 (P-13)
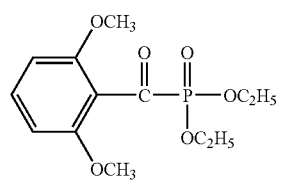 (P-14)
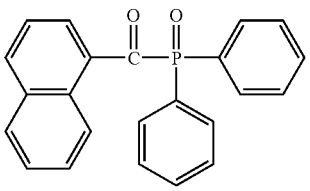 (P-15)
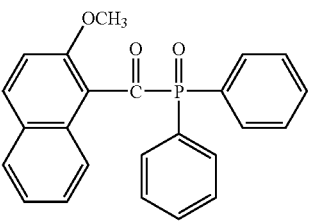 (P-16)
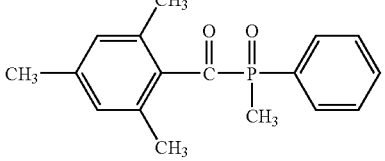 (P-17)
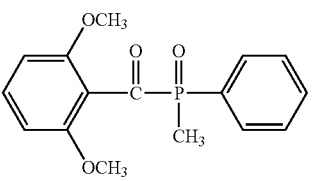 (P-18)
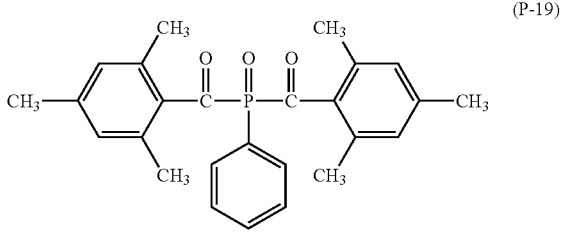 (P-19)
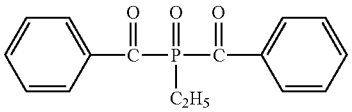 (P-20)
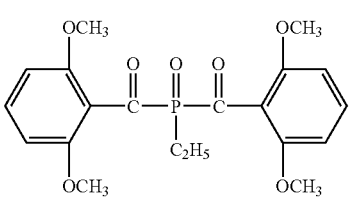 (P-21)

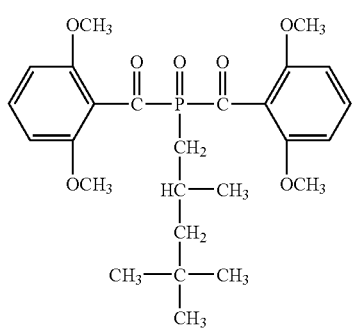
(P-22)

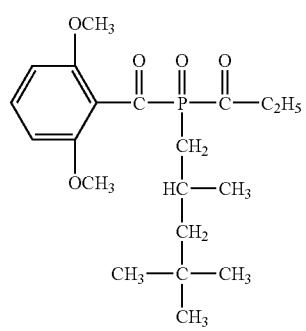
(P-23)

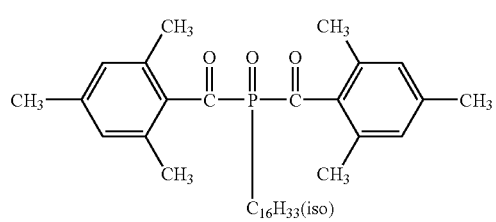
(P-24)

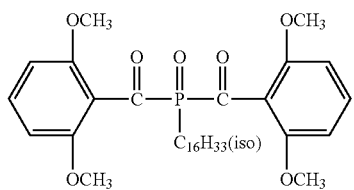
(P-25)

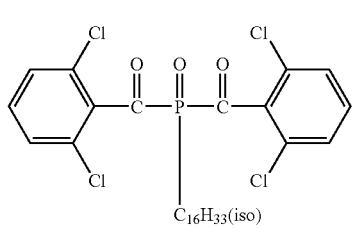
(P-26)

As the acylphosphine oxide compound, a monoacylphosphine oxide compound, a bisacylphosphine oxide compound, etc. may be used, and as the monoacylphosphine oxide compound a known monoacylphosphine oxide compound may be used. Examples thereof include monoacylphosphine oxide compounds described in JP-B-60-8047 and JP-B-63-40799. Specific examples thereof include bis(2,4,6-trimethylbenzoyl)phenylphosphine oxide, 2,4,6-trimethylbenzoyldiphenylphosphine oxide, methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluylphenylphosphinate, methyl o-toluylphenylphosphinate, methyl 2,4-dimethylbenzoylphenylphosphinate, isopropyl p-tert-butylbenzoylphenylphosphinate, methyl acryloylphenylphosphinate, isobutyryldiphenylphosphine oxide, 2-ethylhexanoyidiphenylphosphine oxide, o-toluyldiphenylphosphine oxide, p-tert-butylbenzoyldiphenylphosphine oxide, 3-pyridylcarbonyidiphenylphosphine oxide, acryloyldiphenylphosphine oxide, benzoyldiphenylphosphine oxide, vinyl pivaloylphenylphosphinate, adipoylbis(diphenylphosphine oxide), pivaloyidiphenylphosphine oxide, p-toluyldiphenylphosphine oxide, 4-(tert-butyl)benzoyidiphenylphosphine oxide, 2-methylbenzoyidiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphenylphosphine oxide.

Among them, as the acylphosphine oxide compound in the present invention, bis(2,4,6-trimethylbenzoyl)phenylphosphine oxide (IRGACURE 819: manufactured by Ciba Specialty Chemicals), bis(2,6-dimethoxybenzoyl)-2,4,4-trimethylpentylphenylphosphine oxide, 2,4,6-trimethylbenzoyldiphenylphosphine oxide (DAROCUR TPO: manufactured by Ciba Specialty Chemicals, LUCIRIN TPO: manufactured by BASF), etc. are preferable.

Other Radical Polymerization Initiators

In the present invention, the radical polymerization initiator may comprise another radical polymerization initiator. Examples of the other radical polymerization initiators include an α-aminoacetophenone compound, an α-hydroxyacetophenone compound and an oxime ester compound.

α-Aminoacetophenone Compound

One type of α-aminoacetophenone compound may be used on its own or two or more types thereof may be used.

As the α-aminoacetophenone compound, a compound represented by Formula (B5) below may preferably be used.

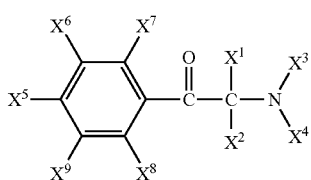
(B5)

In the formula, $X^1$ denotes a group represented by (a), (b), or (c) below.

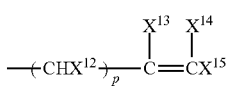
(a)

In the formula, p is 0 or 1

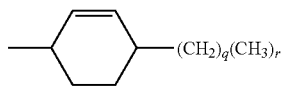
(b)

In the formula, q is an integer of 0 to 3 and r is 0 or 1. When r is 0, $(CH_3)_r$ denotes a hydrogen atom.

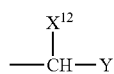
(c)

In the formula, Y denotes a hydrogen atom, a halogen atom, an OH group, an alkyl group having at least 1 but no greater than 12 carbons (unless otherwise specified, the alkyl group means a straight chain or branched alkyl group, the same applies below), an alkoxy group having at least 1 but no greater than 12 carbons, an aromatic group, or a heterocyclic group. Preferred examples of the aromatic group include a phenyl group and a naphthyl group. Preferred examples of the heterocyclic group include a furyl group, a thienyl group, and a pyridyl group.

The alkyl group, alkoxy group, aromatic group, and heterocyclic group denoted by Y may have a substituent.

Examples of the substituent that the alkyl group denoted by Y may have include an OH group, a halogen atom, $—N(X^{10})_2$ ($X^{10}$ denotes a hydrogen atom, an alkyl group having at least 1 but no greater than 8 carbons, an alkenyl group having at least 3 but no greater than 5 carbons, a phenylalkyl group having at least 7 but no greater than 9 carbons, a hydroxyalkyl group having at least 1 but no greater than 4 carbons, or a phenyl group, and the two $X^{10}$s may be identical to or different from each other), an alkoxy group having at least 1 but no greater than 12 carbons, —COOR (R denotes an alkyl group having at least 1 but no greater than 18 carbons), —CO$(OCH_2OCH_2)_nOCH_3$ (n denotes an integer of at least 1 but no greater than 20), and —OCOR (R denotes an alkyl group having at least 1 but no greater than 4 carbons).

Examples of the substituent that the alkoxy group denoted by Y may have include —COOR (R denotes an alkyl group having at least 1 but no greater than 18 carbons) and —CO$(OCH_2CH_2)_nOCH_3$ (n denotes an integer of at least 1 but no greater than 20).

Examples of the substituent that the aromatic group or heterocyclic group denoted by Y may have include —$(OCH_2CH_2)_nOH$ (n denotes an integer of at least 1 but no greater than 20), —$(OCH_2CH_2)_nOCH_3$ (n denotes an integer of at least 1 but no greater than 20), an alkylthio group having at least 1 but no greater than 8 carbons, a phenoxy group, —COOR (R denotes an alkyl group having at least 1 but no greater than 18 carbons), —CO$(OCH_2CH_2)_nOCH_3$ (n denotes an integer of at least 1 but no greater than 20), a phenyl group, and a benzyl group.

Two or more such substituents may be present if this is possible, and the substituent may further be substituted if this is possible.

Furthermore, in the formula, $X^{12}$ denotes a hydrogen atom, an alkyl group having at least 1 but no greater than 8 carbons, or a phenyl group. $X^{13}$, $X^{14}$, and $X^{15}$ independently denote a hydrogen atom or an alkyl group having at least 1 but no greater than 4 carbons. $X^{13}$ and $X^{14}$ may be bridged to form an alkylene group having at least 3 but no greater than 7 carbons.

In the formula, $X^2$ denotes the same group as for $X^1$ above, a cycloalkyl group having 5 or 6 carbons, an alkyl group having at least 1 but no greater than 12 carbons, or a phenyl group.

The alkyl group and phenyl group denoted by $X^2$ may have a substituent.

Examples of the substituent that the alkyl group denoted by $X^2$ may have include an alkoxy group having at least 1 but no greater than 4 carbons, a phenoxy group, a halogen atom, and a phenyl group.

Examples of the substituent that the phenyl group denoted by $X^2$ may have include a halogen atom, an alkyl group having at least 1 but no greater than 12 carbons, and an alkoxy group having at least 1 but no greater than 4 carbons.

Two or more such substituents may be present if this is possible, and the substituent may further be substituted if this is possible.

Furthermore, in the formula, $X^1$ and $X^2$ may be bridged to form a group represented by the formulae below.

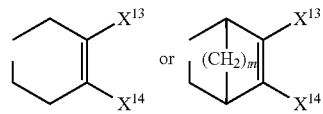

In the formula, $X^3$ denotes a hydrogen atom, an alkyl group having at least 1 but no greater than 12 carbons, an alkenyl group having at least 3 but no greater than 5 carbons, a cycloalkyl group having at least 5 but no greater than 12 carbons, or a phenylalkyl group having at least 7 but no greater than 9 carbons.

The alkyl group, alkenyl group, cycloalkyl group, and phenylalkyl group denoted by $X^3$ may have a substituent, and examples of the substituent include an OH group, an alkoxy group having at least 1 but no greater than 4 carbons, —CN, and —COOR (R denotes an alkyl group having at least 1 but no greater than 4 carbons).

In the formula, $X^4$ denotes an alkyl group having at least 1 but no greater than 12 carbons, an alkenyl group having at least 3 but no greater than 5 carbons, a cycloalkyl group having at least 5 but no greater than 12 carbons, a phenylalkyl group having at least 7 but no greater than 9 carbons, or a phenyl group.

The alkyl group, alkenyl group, cycloalkyl group, phenylalkyl group, and phenyl group denoted by $X^4$ may have a substituent.

Examples of the substituent that the alkyl group, alkenyl group, cycloalkyl group, and phenylalkyl group denoted by $X^4$ may have include an OH group, an alkoxy group having at least 1 but no greater than 4 carbons, —CN, and —COOR (R denotes an alkyl group having at least 1 but no greater than 4 carbons). When the alkyl group denoted by $X^4$ has a substituent, the number of carbons in the alkyl group that is substituted is preferably at least 2 but no greater than 4.

Examples of the substituent that the phenyl group denoted by $X^4$ may have include a halogen atom, an alkyl group having at least 1 but no greater than 12 carbons, an alkoxy group having at least 1 but no greater than 4 carbons, and —COOR (R denotes an alkyl group having at least 1 but no greater than 4 carbons).

Here, $X^2$ and $X^4$ may be bridged to form an alkylene group having at least 1 but no greater than 7 carbons, a phenylalkylene group having at least 7 but no greater than 10 carbons, an o-xylylene group, a 2-butenylene group, or an oxa- or aza-alkylene group having 2 or 3 carbons.

Furthermore, $X^3$ and $X^4$ may be bridged to form an alkylene group having at least 3 but no greater than 7 carbons.

The alkylene group formed by bridging $X^3$ and $X^4$ may have as a substituent an OH group, an alkoxy group having at least 1 but no greater than 4 carbons, or —COOR (R denotes alkyl having at least 1 but no greater than 4 carbons), or may contain in a bond —O—, —S—, —CO—, or —N($X^{16}$)— ($X^{16}$ denotes a hydrogen atom, an alkyl group having at least 1 but no greater than 12 carbons, or an alkyl group having at least 1 but no greater than 12 carbons and containing in a bonding chain one or more —O—, an alkenyl group having at least 3 but no greater than 5 carbons, a phenylalkyl group having at least 7 but no greater than 9 carbons, a hydroxyalkyl group having at least 1 but no greater than 4 carbons, —CH₂CH₂CN, —CH₂CH₂COOR (R denotes an alkyl group having at least 1 but no greater than 4 carbons), an alkanoyl group having at least 2 but no greater than 8 carbons, or a benzoyl group).

In the formula, $X^5$, $X^6$, $X^7$, $X^8$, and $X^9$ independently denote a hydrogen atom, a halogen atom, an alkyl group having at least 1 but no greater than 12 carbons, a cycloalkyl group having 5 or 6 carbons, a phenyl group, a benzyl group, a benzoyl group, an —O$X^{17}$ group, an —S$X^{18}$ group, an —SO—$X^{18}$ group, an —SO₂—$X^{18}$ group, an —N($X^{19}$)($X^{20}$) group, an —NH—SO₂—$X^{21}$ group, or a group represented by the formula below.

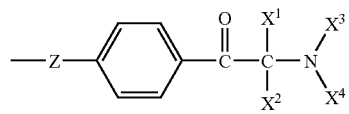

In the formula, Z denotes —O—, —S—, —N($X^{10}$)—$X^{11}$—N($X^{10}$)—, or a group represented by the formula below. $X^1$, $X^2$, $X^3$, and $X^4$ have the same meanings as defined for Formula (B5).

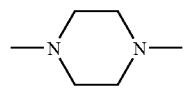

In the formula, $X^{10}$ is the same as described above, and $X^{11}$ denotes a straight chain or branched alkylene group having at least 2 but no greater than 16 carbons, or a straight chain or branched alkylene group having at least 2 but no greater than 16 carbons in which at least one —O—, —S—, or —N($X^{10}$)— is present in the chain ($X^{10}$ is the same as above).

$X^{17}$ denotes a hydrogen atom, an alkyl group having at least 1 but no greater than 12 carbons, —(CH₂CH₂O)$_n$H (n is an integer of at least 2 but no greater than 20), an alkanoyl group having at least 2 but no greater than 8 carbons, an alkenyl group having at least 3 but no greater than 12 carbons, a cyclohexyl group, a hydroxycyclohexyl group, a phenyl group, a phenylalkyl group having at least 7 but no greater than 9 carbons, or —Si($R^4$)$_r$($R^5$)$_{3-r}$ ($R^4$ is an alkyl group having at least 1 but no greater than 8 carbons, $R^5$ is a phenyl group, and r is 1, 2, or 3).

The alkyl group and phenyl group denoted by $X^{17}$ may have a substituent.

Examples of the substituent that the alkyl group denoted by $X^{17}$ may have include —CN, —OH, an alkoxy group having at least 1 but no greater than 4 carbons, an alkenyloxy group having at least 3 but no greater than 6 carbons, —OCH₂CH₂CN, —CH₂CH₂COOR (R denotes an alkyl group having at least 1 but no greater than 4 carbons), —COOH, or —COOR (R denotes an alkyl group having at least 1 but no greater than 4 carbons). Furthermore, when the alkyl group denoted by $X^{17}$ has a substituent, the number of carbons of the alkyl group that is substituted is preferably at least 1 but no greater than 6.

Examples of the substituent that the phenyl group denoted by $X^{17}$ may have include a halogen atom, an alkyl group having at least 1 but no greater than 12 carbons, or an alkoxy group having at least 1 but no greater than 4 carbons.

$X^{18}$ denotes a hydrogen atom, an alkyl group having at least 1 but no greater than 12 carbons, an alkenyl group having at least 3 but no greater than 12 carbons, a cyclohexyl group, a phenyl group, or a phenylalkyl group having at least 7 but no greater than 9 carbons.

The alkyl group and phenyl group denoted by $X^{18}$ may have a substituent.

Examples of the substituent that the alkyl group denoted by $X^{18}$ may have include —SH, —OH, —CN, —COOR (R denotes an alkyl group having at least 1 but no greater than 4 carbons), an alkoxy group having at least 1 but no greater than 4 carbons, —OCH₂CH₂CN, or —OCH₂CH₂COOR (R denotes alkyl having at least 1 but no greater than 4 carbons).

Examples of the substituent that the phenyl group denoted by $X^{18}$ may have include a halogen atom, an alkyl group having at least 1 but no greater than 12 carbons, or an alkoxy group having at least 1 but no greater than 4 carbons.

$X^{19}$ and $X^{20}$ independently denote a hydrogen atom; an alkyl group having at least 1 but no greater than 12 carbons; a hydroxyalkyl group having at least 2 but no greater than 4 carbons; an alkoxyalkyl group having at least 2 but no greater than 10 carbons; an alkenyl group having at least 3 but no greater than 5 carbons; a cycloalkyl group having at least 5 but no greater than 12 carbons; a phenylalkyl group having at least 7 but no greater than 9 carbons; a phenyl group; a phenyl group substituted with a halogen atom, an alkyl group having at least 1 but no greater than 12 carbons, or an alkoxy group having at least 1 but no greater than 4 carbons; an alkanoyl group having 2 or 3 carbons; or a benzoyl group. Furthermore, $X^{19}$ and $X^{20}$ may be bridged to form an alkylene group having at least 2 but no greater than 8 carbons, an alkylene group having at least 2 but no greater than 8 carbons that is substituted with an OH group, an alkoxy group having at least 1 but no greater than 4 carbons, or a —COOR (R is alkyl group having at least 1 but no greater than 4 carbons); or an alkylene group having at least 2 but no greater than 8 carbons that contains in the bonding chain —O—, —S—, or —N($X^{16}$)— ($X^{16}$ is the same as above).

$X^{21}$ denotes an alkyl group having at least 1 but no greater than 18 carbons; a phenyl group; a naphthyl group; or a phenyl group or naphthyl group substituted with a halogen atom, an alkyl group having at least 1 but no greater than 12 carbons, or an alkoxy group having at least 1 but no greater than 8 carbons.

Formula (B5) is preferably represented by Formula (d).

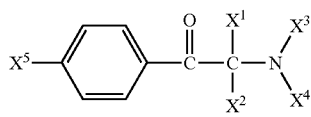

(d)

In Formula (d), $X^1$ and $X^2$ independently denote a methyl group, an ethyl group, or a benzyl group, —$NX^3X^4$ denotes a dimethylamino group, a diethylamino group, or a morpholino group, and $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group. The benzyl group may be substituted with an alkyl group having at least 1 but no greater than 4 carbons.

Among them, it is preferable that $NX^3X^4$ is a dimethylamino group or a morpholino group, and $X^5$ is an alkylthio group having 1 to 4 carbons or a morpholino group.

Furthermore, as the α-aminoacetophenone compound, an acid adduct salt of the compound represented by Formula (B5) above may be used.

Moreover, examples of commercial α-aminoacetophenone compounds include polymerization initiators available under the product names IRGACURE 907, IRGACURE 369, and IRGACURE 379 from Ciba Specialty Chemicals, and they may be used suitably.

Specific examples of the α-aminoacetophenone compound include the compounds below.

That is, there are 2-dimethylamino-2-methyl-1-phenylpropan-1-one, 2-diethylamino-2-methyl-1-phenylpropan-1-one, 2-methyl-2-morpholino-1-phenylpropan-1-one, 2-dimethylamino-2-methyl-1-(4-methylphenyl)propan-1-one, 2-dimethylamino-1-(4-ethylphenyl)-2-methylpropan-1-one, 2-dimethylamino-1-(4-isopropylphenyl)-2-methylpropan-1-one, 1-(4-butylphenyl)-2-dimethylamino-2-methylpropan-1-one, 2-dimethylamino-1-(4-methoxyphenyl)-2-methylpropan-1-one, 2-dimethylamino-2-methyl-1-(4-methylthiophenyl)propan-1-one, 2-methyl-1-(4-methylthiophenyl)-2-morpholinopropan-1-one (IRGACURE 907), 2-benzyl-2-dimethylamino-1-(4-morpholinophenyl)butan-1-one (IRGACURE 369), 2-benzyl-2-dimethylamino-1-(4-dimethylaminophenyl)butan-1-one, and 2-dimethylamino-2-[(4-methylphenyl)methyl]-1-[4-(4-morpholinyl)phenyl]-1-butanone (IRGACURE 379).

α-Hydroxyacetophenone Compound

The α-hydroxyacetophenone compound is preferably a compound represented by Formula (B6) below.

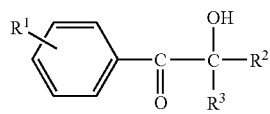

(B6)

In Formula (B6), $R^1$ denotes a hydrogen atom, an alkyl group having at least 1 but no greater than 10 carbons, or an alkoxy group having at least 1 but no greater than 10 carbons. $R^2$ and $R^3$ independently denote a hydrogen atom or an alkyl group having at least 1 but no greater than 10 carbons. Furthermore, $R^2$ and $R^3$ may be bonded to form a ring having at least 4 but no greater than 8 carbons.

The alkyl group, the alkoxy group, and the ring having at least 4 but no greater than 8 carbons may have a substituent, and examples of the substituent include substituents cited for Formula (B1).

Examples of the α-hydroxyacetophenone include 2-hydroxy-2-methyl-1-phenylpropan-1-one (DAROCUR 1173), 2-hydroxy-2-methyl-1-phenylbutan-1-one, 1-(4-methylphenyl)-2-hydroxy-2-methylpropan-1-one, 1-(4-isopropylphenyl)-2-methylpropan-1-one, 1-(4-butylphenyl)-2-hydroxy-2-methylpropan-1-one, 2-hydroxy-2-methyl-1-(4-octylphenyl)propan-1-one, 1-(4-dodecylphenyl)-2-methylpropan-1-one, 1-(4-methoxyphenyl)-2-methylpropan-1-one, 1-(4-methylthiophenyl)-2-methylpropan-1-one, 1-(4-chlorophenyl)-2-hydroxy-2-methylpropan-1-one, 1-(4-bromophenyl)-2-hydroxy-2-methylpropan-1-one, 2-hydroxy-1-(4-hydroxyphenyl)-2-methylpropan-1-one, 1-(4-dimethylaminophenyl)-2-hydroxy-2-methylpropan-1-one, 1-(4-carboethoxyphenyl)-2-hydroxy-2-methylpropan-1-one, 1-hydroxycyclohexyl phenyl ketone (IRGACURE 184), and 1-[4-(2-hydroxyethoxy)phenyl]-2-hydroxy-2-methyl-1-propan-1-one (IRGACURE 2959).

Furthermore, as commercial α-hydroxyacetophenone compounds, polymerization initiators available under the product names IRGACURE 184, DAROCUR 1173, IRGACURE 127, and IRGACURE 2959 from Ciba Specialty Chemicals may be used.

Oxime Ester Compound

As the oxime ester compound, a compound represented by Formula (B7) below is preferable.

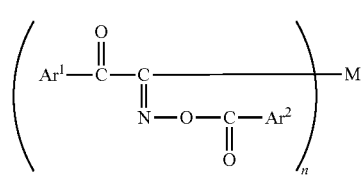

(B7)

In the formula, $Ar^1$ denotes a structure selected from the group consisting of a naphthalene structure, an anthracene structure, an anthraquinone structure, a benzophenone structure, a thianthrene structure, a phenoxathiane structure, a diphenylthioether structure, a thioxanthone structure, and a morpholinobenzene structure. Among them, the naphthalene structure, the anthraquinone structure, the benzophenone structure, the diphenylthioether structure, the thioxanthone structure, and the morpholinobenzene structures are preferable, and the thioxanthone structure is particularly preferable. $Ar^2$ denotes a phenyl group. These structures or group may have a substituent such as an alkyl group such as a methyl group or an ethyl group, a halogen atom, or —CN (cyano group).

n denotes an integer of 1 or 2. When n is 1, M denotes an alkyl group having at least 1 but no greater than 20 carbons such as a methyl group or an ethyl group, a cycloalkyl group having at least 5 but no greater than 8 carbons such as a cyclopropyl group or a cyclohexyl group, an alkanoyloxy group having at least 2 but no greater than 20 carbons such as an acetyloxy group or a propanoyloxy group, an alkoxycarbonyl group having at least 2 but no greater than 12 carbons such as a propyloxycarbonyl group or a butyloxycarbonyl group, a monovalent group in which an alkoxy group is linked to one bonding site of a divalent group in which a plurality of polymethylene groups are linked via an ether bond, a phenyl group, a benzoyl group, a benzoyloxy group, a phenoxycarbonyl group, an aralkylcarbonyloxy group having at least 7 but no greater than 13 carbons, an aralkyloxycarbonyl group having at least 7 but no greater than 13 carbons, or an alkylthio group having at least 7 but no greater than 6 carbons. Among them, M is preferably an alkyl group having at least 1 but no greater than 20 carbons or a phenyl group.

When n is 2, M denotes an alkylene group having at least 1 but no greater than 12 carbons such as an ethylene group or a propylene group, a polymethylene group having at least 3 but no greater than 12 carbons such as a tetramethylene group, an oxyalkyleneoxy group having at least 1 but no greater than 12 carbons such as an oxypropyleneoxy group or an oxybutyleneoxy group, a cyclohexylene group, a phenylene group, —CO—O-A-O—CO—, —CO—O—$(CH_2CH_2O)_m$—CO—, or —CO-A-CO—; A denotes an alkylene group having at least 2 but no greater than 12 carbons, and m denotes an integer of at least 1 but no greater than 20. Among them, M is preferably an alkylene group having at least 1 but no greater than 6 carbons, a polymethylene group having at least 3 but no greater than 12 carbons, or a cyclohexylene group.

Specific examples of the oxime ester compound include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Furthermore, as commercial oxime ester compounds, polymerization initiators available under the product names IRGACURE OXE-01 (1-(4-phenylthiophenyl)-1,2-octanedione-2-(O-benzoyloxime)) and IRGACURE OXE-02 (1-[9-ethyl-6-(2-methylbenzoyl)-9H-carbazol-3-yl]ethanone-1-(O-acetyloxime)) from Ciba Specialty Chemicals may be used.

In the ink composition of the present invention, the total amount of polymerization initiator used, relative to the ink composition, is preferably 0.01 to 35 wt %, more preferably 0.5 to 20 wt %, and yet more preferable 1.0 to 15 wt %. When it is at least 0.01 wt %, the composition can be cured fully, and when it is no greater than 35 wt %, a cured film having a uniform degree of curing can be obtained.

Furthermore, in the present invention, it is preferable to use an acylphosphine oxide compound as the polymerization initiator, and it is preferable to use the acylphosphine oxide compound at 0.01 to 35 wt % of the total amount of the ink composition, more preferably 1 to 25 wt %, and yet more preferably 3 to 20 wt %.

Furthermore, when a sensitizer, which will be described later, is used in the ink composition of the present invention, the total amount of polymerization initiator used is preferably 200:1 to 1:200 relative to the sensitizer as a ratio by weight of polymerization initiator:sensitizer, more preferably 50:1 to 1:50, and yet more preferably 20:1 to 1:5.

(C) Pigment

The ink composition of the present invention comprises a pigment as an essential component. Pigment particles having a small particle size can form a sharp image having excellent coloring properties since they are dispersed uniformly and stably in the ink composition due to the function of the specific polymer (D), which will be described later.

The pigment is not particularly limited, and various known pigments and dyes may be selected appropriately according to the intended purpose and used. Since a pigment is contained as a colorant, an image obtained from the ink composition of the present invention has excellent weatherability.

The pigment that can be used in the present invention is not particularly limited, and it is possible to use any generally commercially available organic pigment or inorganic pigment, a dispersion of a pigment in an insoluble resin, etc. as a dispersion medium, a pigment on the surface of which a resin has been grafted, etc. It is also possible to use resin particles colored with a dye, etc.

Examples of these pigments include pigments described in 'Ganryo no Jiten' (Dictionary of Pigments) Ed. by Seijirou Ito (2000), W. Herbst, K. Hunger 'Industrial Organic Pigments', JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as CI Pigment Yellow 1 (Fast Yellow G, etc.) and CI Pigment Yellow 74, disazo pigments such as CI Pigment Yellow 12 (Disazo Yellow AAA, etc.) and CI Pigment Yellow 17, benzidine-free azo pigments such as CI Pigment Yellow 180, azo lake pigments such as CI Pigment Yellow 100 (Tartrazine Yellow Lake, etc.), condensed azo pigments such as CI Pigment Yellow 95 (Azo Condensation Yellow GR, etc.), acidic dye lake pigments such as CI Pigment Yellow 115 (Quinoline Yellow Lake, etc.), basic dye lake pigments such as CI Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as CI Pigment Yellow 153 (Nickel Nitroso Yellow, etc.), and metal complex azomethine pigments such as CI Pigment Yellow 117 (Copper Azomethine Yellow, etc.) and CI Pigment Yellow 120 (quinacridone pigments PY120, etc.).

Examples of pigments exhibiting a red or magenta color include monoazo pigments such as CI Pigment Red 3 (Toluidine Red, etc.), disazo pigments such as CI Pigment Red 38 (Pyrazolone Red B, etc.), azo lake pigments such as CI Pigment Red 53:1 (Lake Red C, etc.) and CI Pigment Red 57:1 (Brilliant Carmine 6B), condensed azo pigments such as CI Pigment Red 144 (Azo Condensation Red BR, etc.), acidic dye lake pigments such as CI Pigment Red 174 (Phloxine B Lake, etc.), basic dye lake pigments such as CI Pigment Red 81 (Rhodamine 6G' Lake, etc.), anthraquinone pigments such as CI Pigment Red 177 (Dianthraquinonyl Red, etc.), thioindigo pigments such as CI Pigment Red 88 (Thioindigo Bordeaux, etc.), perinone pigments such as CI Pigment Red 194 (Perinone Red, etc.), perylene pigments such as CI Pigment Red 149 (Perylene Scarlet, etc.), quinacridone pigments such as CI Pigment violet 19 (unsubstituted quinachridone) and CI Pigment Red 122 (Quinacridone Magenta, etc.), isoindolinone pigments such as CI Pigment Red 180 (Isoindolinone Red 2BLT, etc.), and alizarin lake pigments such as CI Pigment Red 83 (Madder Lake, etc.).

Examples of pigments exhibiting a blue or cyan color include disazo pigments such as CI Pigment Blue 25 (Dianisidine Blue, etc.), phthalocyanine pigments such as CI Pigment Blue 15 (Phthalocyanine Blue, etc.) and CI Pigment Blue 15:3, acidic dye lake pigments such as CI Pigment Blue 24 (Peacock Blue Lake, etc.), basic dye lake pigments such as CI Pigment Blue 1 (Victoria Pure Blue BO Lake, etc.), anthraquinone pigments such as CI Pigment Blue 60 (Indanthrone Blue, etc.), and alkali blue pigments such as CI Pigment Blue 18 (Alkali Blue V-5:1).

Examples of pigments exhibiting a green color include phthalocyanine pigments such as CI Pigment Green 7 (Phthalocyanine Green) and CI Pigment Green 36 (Phthalocyanine Green), and azo metal complex pigments such as CI Pigment Green 8 (Nitroso Green).

Examples of pigments exhibiting an orange color include isoindoline pigments such as CI Pigment Orange 66 (Isoindoline Orange) and anthraquinone pigments such as CI Pigment Orange 51 (Dichloropyranthrone Orange).

Examples of pigments exhibiting a black color include Pigment Black 7 (carbon black), titanium black, and aniline black.

Specific examples of white pigments that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the pigment, for example, a dispersing machine such as a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

When carrying out dispersion of the pigment, a specific polymer (D) may preferably be added.

Furthermore, when the pigment is added, as a dispersion adjuvant, if necessary, it is also possible to use a synergist, depending on the various types of pigment. The dispersion adjuvant is preferably used at 1 to 50 parts by weight relative to 100 parts by weight of the pigment.

In the ink composition, as a dispersing medium for various components such as the pigment, a solvent may be added, or the polymerizable compound (A), which is a low molecular weight compound, may be used as a dispersing medium without using a solvent, and since the ink composition of the present invention is a radiation curing type ink, and after the ink is applied on top of a recording medium it is cured, it is preferable not to use a solvent. This is because, if a solvent remains in the cured ink image, the solvent resistance is degraded and the VOC (Volatile Organic Compound) problem of the residual solvent occurs. From this viewpoint, it is preferable to use as a dispersing medium the polymerizable compound (A) and, in particular, it is preferable to select a polymerizable compound having the lowest viscosity in terms of improvement of dispersion suitability and handling properties of the ink composition.

Since the smaller the average particle size of a pigment other than white used in the ink composition, the better the coloring properties, it is preferably on the order of 0.01 to 0.4 µm, and more preferably 0.02 to 0.3 µm. In order to make the maximum particle size 3 µm, and preferably 1 µm, the pigment (C), the dispersant, and the dispersing medium are selected, and dispersion conditions and filtration conditions are set. Furthermore, the average particle size of a pigment used in a white ink composition is preferably on the order of 0.1 to 0.5 µm from the viewpoint of a sufficient hiding power being given, and more preferably on the order of 0.15 to 0.3 µm. In the same way as for ink compositions of other colors, in order to make the maximum particle size 3 µm, and preferably 1 µm, the pigment (C), the dispersant, and the dispersing medium are selected, and dispersion conditions and filtration conditions are set. By such control of particle size, clogging of a head nozzle can be suppressed, and the storage stability of an ink, ink transparency, and curing sensitivity can be maintained. In the present invention, since a specific polymer (D) having excellent dispersibility and stability is used, a uniform and stable dispersion is obtained even when a fine particulate pigment is used.

The particle size of the pigment in the ink composition may be measured by a known measurement method. Specifically, it may be measured by a centrifugal sedimentation light transmission method, an X-ray transmission method, a laser diffraction/scattering method, or a dynamic light scattering method.

It is preferable to add the pigment at 1 to 20 wt % of the ink composition on a solids content basis, and more preferably 2 to 10 wt %.

(D) Graft Copolymer having Repeating Unit Represented b Formula (D1) in Graft Chain The graft copolymer (D) having a repeating unit of Formula (D1) (hereinafter, called a 'specific repeating unit' as appropriate) in a graft chain (hereinafter, called a 'specific polymer (D)' as appropriate) is explained.

Formula (D1) is as follows.

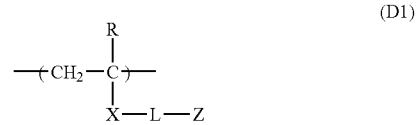

R in Formula (D1) denotes a hydrogen atom or a methyl group.

X in Formula (D1) denotes a single bond, —O—, —CO—, —(CO)O—, —CONR$^1$—, —O(CO)—, or a phenylene group, and among them —(CO)O—, —CONR$^1$—, or a phenylene group is preferable. R$^1$ denotes a hydrogen atom, an optionally substituted alkyl group (e.g. a methyl group, an ethyl group, an n-propyl group, an i-propyl group, an n-butyl group, an n-hexyl group, an n-octyl group, a 2-hydroxyethyl group), an optionally substituted aryl group (e.g. a phenyl group), or an optionally substituted aralkyl group, and among them a hydrogen atom or an alkyl group having 1 to 3 carbons is preferable.

Furthermore, examples of the substituent above include a halogen atom, a hydroxyl group, an amino group, a siloxane group, and a substituent having no greater than 30 carbons.

L in Formula (D1) denotes a single bond or a divalent linking group. Examples of the divalent linking group include a straight-chain, branched, or cyclic alkylene group, an aralkylene group, and an arylene group, which may have a substituent. As the alkylene group, one having 1 to 10 carbons (e.g. a methylene group, an ethylene group, a propylene group, a butylene group, a pentylene group, a hexylene group, an octylene group, a decylene group) is preferable, and one having 1 to 4 carbons (e.g. a methylene group, an ethylene group, a propylene group) is more preferable. As the aralkylene group, an aralkylene group having 7 to 13 carbons is preferable. Examples of the aralkylene group having 7 to 13 carbons include a group in which two hydrogen atoms are removed from toluene (—C(Ph)H—, —CH$_2$(Ph)—) and a group in which two hydrogen atoms are removed from β-methylstyrene. As the arylene group denoted by L, an arylene group having 6 to 12 carbons is preferable; examples thereof include a phenylene group, a cumenylene group, a mesitylene group, a tolylene group, and a xylylene group, and among them a phenylene group is preferable. Each divalent linking group may have as a bonding group —NR$^4$—, —(CO)O—, —O(CO)—, —O—, —SO$_2$NH—, —NHSO$_2$—, —NH(CO)O—, —O(CO)NH—, or a group derived from a heterocycle. R$^4$ denotes a hydrogen atom or an alkyl group, and examples thereof include a hydrogen atom, a methyl group, an ethyl group, and a propyl group.

Z in Formula (D1) denotes —NR$^2$R$^3$; R$^2$ and R$^3$ independently denote a hydrogen atom, an alkyl group having 1 to 6 carbons, an aryl group having 6 to 20 carbons, or an aralkyl group having 7 to 20 carbons, and they may be bonded to each other to form a ring. As R$^2$ and R$^3$, a hydrogen atom, a methyl group, or an ethyl group is preferable, and a methyl group or an ethyl group is more preferable. The alkyl group, aryl group, and aralkyl group denoted by R$^2$ and R$^3$ may have a substituent, and examples of the substituent include a halogen atom.

That is, the specific polymer (D) is a graft copolymer having a basic functional group (—NR$^2$R$^3$) in a graft chain as a side chain.

The specific polymer (D) preferably comprises a plurality of specific repeating units in a graft chain. The proportion of the specific repeating units is preferably 1 to 50 wt % relative to the weight of the specific polymer, more preferably 2 to 40 wt %, and particularly preferably 5 to 30 wt %.

Among graft copolymers having a repeating unit represented by Formula (D1) in a graft chain, the specific polymer (D) is preferably a graft copolymer comprising a constituent repeating unit represented by Formula (D2). It is preferable for it to comprise a graft chain formed only from a repeating unit of Formula (D1), that is, to use a copolymer comprising a copolymer component containing a constituent repeating unit represented by Formula (D2).

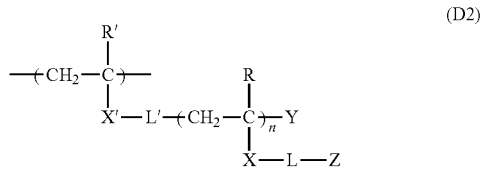

(D2)

R and R' in Formula (D2) independently denote a hydrogen atom or a methyl group.

X and X' in Formula (D2) denote a single bond, —O—, —CO—, —(CO)O—, —CONR$^5$—, —O(CO)—, or a phenylene group, and among them, —(CO)O—, —CONR$^5$—, or a phenylene group is preferable. R$^5$ denotes a hydrogen atom, an alkyl group (e.g. a methyl group, an ethyl group, an n-propyl group, an i-propyl group, an n-butyl group, an n-hexyl group, an n-octyl group, a 2-hydroxyethyl group), an aryl group (e.g. a phenyl group), or an aralkyl group.

The alkyl group denoted by R$^5$ preferably has 1 to 20 carbons, and more preferably 1 to 8 carbons. The alkyl group may be substituted, and examples of the substituent include a hydroxy group, a halogen atom, and an alkoxy group having 1 to 8 carbons. The aryl group denoted by R$^5$ preferably has 6 to 20 carbons, and more preferably 6 to 10. The aryl group may be substituted, and examples of the substituent include a hydroxy group, a halogen atom, and an alkyl group having 1 to 20 carbons. The aralkyl group denoted by R$^5$ preferably has 7 to 20 carbons, and examples thereof include a benzyl group, a phenylethyl group, a phenylpropyl group, a naphthylmethyl group, and a naphthylethyl group. Furthermore, the aralkyl group may be substituted, and the substituents are the same as the substituents cited for the aryl group.

L and L' in Formula (D2) denote a single bond or a divalent linking group. Examples of the divalent linking group include a straight-chain, branched, or cyclic alkylene group, an aralkylene group, and an arylene group, which may have a substituent. As the alkylene group, an alkylene group having 1 to 10 carbons (e.g. a methylene group, an ethylene group, a propylene group, a butylene group, a pentylene group, a hexylene group, an octylene group, a decylene group) is preferable, and an alkylene group having 1 to 4 carbons (e.g. a methylene group, an ethylene group, a propylene group) is more preferable.

As the aralkylene group denoted by L or L', an aralkylene group having 7 to 13 carbons is preferable. Examples of the aralkylene group having 7 to 13 carbons include a group in which two hydrogen atoms are removed from toluene (—C(Ph)H—, —CH$_2$(Ph)—) and a group in which two hydrogen atoms are removed from β-methylstyrene. As the arylene group denoted by L or L', an arylene group having 6 to 12 carbons is preferable; examples thereof include a phenylene group, a cumenylene group, a mesitylene group, a tolylene group, and a xylylene group, and among them a phenylene group is preferable. Each divalent linking group may have as a bonding group —NR$^8$—, —(CO)O—, —O(CO)—, —O—, —SO$_2$NH—, —NHSO$_2$—, —NH(CO)O—, —O(CO)NH—, or a group derived from a heterocycle. R$^8$ denotes a hydrogen atom or an alkyl group having 1 to 4 carbons, and examples thereof include a hydrogen atom, a methyl group, an ethyl group, and a propyl group.

Z in Formula (D2) denotes —NR$^6$R$^7$; R$^6$ and R$^7$ independently denote a hydrogen atom, an alkyl group having 1 to 6 carbons, an aryl group having 6 to 20 carbons, or an aralkyl group having 7 to 20 carbons, and they may be bonded to each other to form a ring structure. As R$^6$ and R$^7$, a hydrogen atom, a methyl group, or an ethyl group is preferable, and a methyl group or an ethyl group is more preferable.

It is preferable to use the specific polymer (D) as a pigment dispersant. Since the specific polymer (D) has an amino group having high affinity toward a pigment, it is possible to obtain a stable dispersion by making it adsorb on the pigment well as a result of acid-base interaction. Since the specific polymer (D) is a high molecular weight compound having a specific repeating unit in a graft chain, it is possible to disperse the pigment stably due to a steric repulsion effect of a high molecular weight chain.

The specific polymer (D) may be obtained by a Grafting-onto method in which a graft chain is introduced by a reaction between a functional group of a polymer backbone and an oligomer having a functional group at a terminus and containing an amino group, a method in which an amino group is introduced into a graft chain of a graft copolymer by a subsequent reaction, or a method in which a polymerizable oligomer (macromonomer) containing an amino group having an ethylenic double bond at a terminus is copolymerized. In the present invention, from the viewpoint of a specific repeating unit being introduced in a desired proportion, it is preferable for synthesis to be carried out by a method in which a macromonomer is copolymerized. A macromonomer having a specific repeating unit can easily be synthesized by synthesizing a polymer having a hydroxy group at a chain terminus by adding a hydroxy group-containing mercapto compound such as 6-mercaptohexanol or 2-mercaptoethanol as a radical polymerization chain transfer agent when homopolymerizing an amino group-containing monomer such as 3-dimethylaminopropylacrylamide or copolymerizing it with another monomer, and then reacting the polymer with a monomer such as methacryloyl chloride or methacryloyloxyethyl isocyanate that reacts with the hydroxy group to thus form a covalent bond.

Preferred specific examples of the repeating unit represented by Formula (D1) are listed below. However, the present invention is not limited thereto.

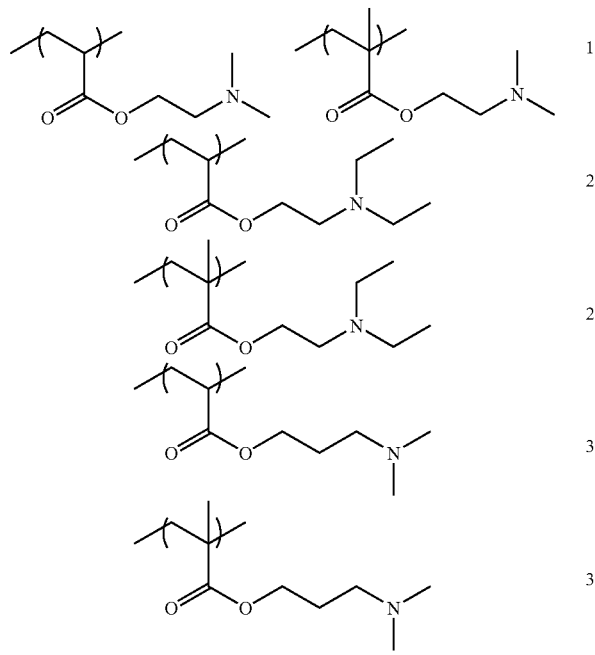

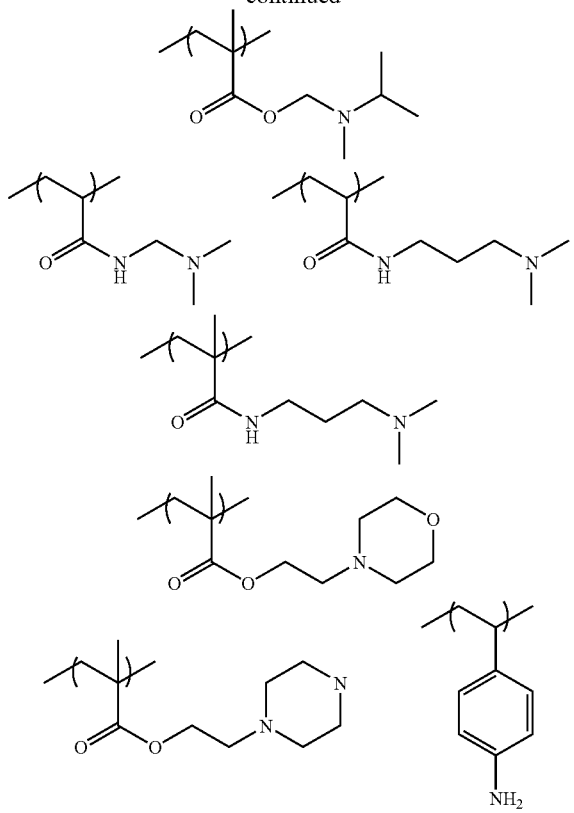

As a polymerizable oligomer that gives a graft copolymer having a repeating unit represented by Formula (D1) in a graft chain (e.g. a graft copolymer comprising a constituent repeating unit represented by Formula (D2)), Compound Examples (d-1) to (d-4) below can for example be cited.

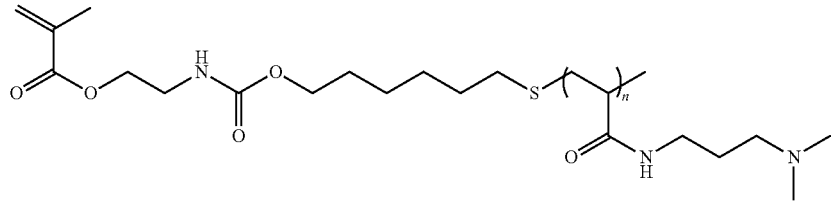

(d-1)

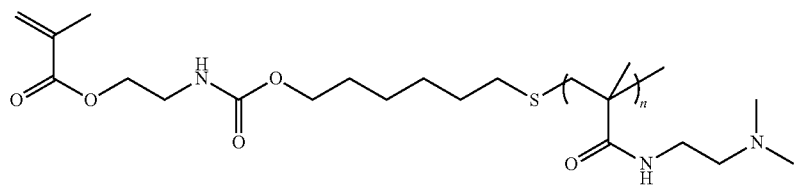

(d-2)

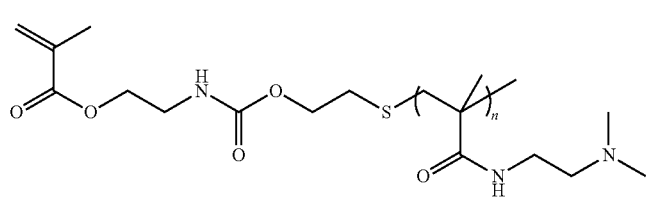

(d-3)

-continued

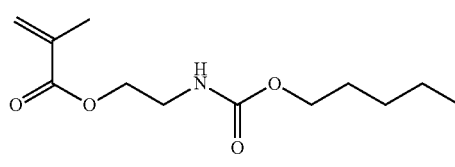 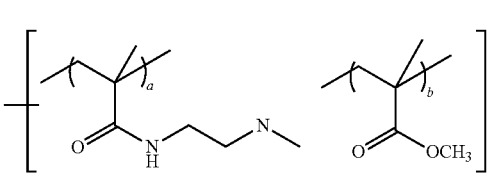

(d-4)

In the present invention, the specific polymer (D) preferably further comprises a graft chain that does not have an amino group. The presence of a graft chain that does not have an amino group increases affinity toward a dispersion medium, thus improving the dispersion stability. Such a graft chain not having an amino group may easily be obtained by copolymerization with a polymerizable oligomer (macromonomer) having an ethylenically unsaturated double bond at a terminus. The polymerizable oligomer used in the present invention comprises a polymer chain moiety and, at a terminus thereof, a polymerizable functional group moiety having an ethylenically unsaturated double bond. Such an ethylenically unsaturated double bond-containing group is preferably present at only one terminus of the polymer chain. As the ethylenically unsaturated double bond-containing group, a (meth)acryloyl group or a vinyl group is preferable, and a (meth)acryloyl group is more preferable. With regard to the molecular weight of the macromonomer, the number-average molecular weight (Mn) on a polystyrene basis is preferably in the range of 1,000 to 50,000, and more preferably in the range of 2,000 to 15,000. It is preferable for the molecular weight of the macromonomer to be at least 1,000 since dispersion stability is good, and it is preferable for it to be no greater than 50,000 since the viscosity is appropriate and good discharge stability can be obtained.

The polymer chain moiety is generally a homopolymer or copolymer comprising at least one type of monomer selected from the group consisting of known vinyl polymerizable compounds such as (meth)acrylate compounds, styrene and derivatives thereof, acrylonitrile, vinyl esters, and dienes, a polyol such as polyethylene oxide or polypropylene oxide, or a polyester such as poly(ε-caprolactone) or poly(γ-butyrolactone).

The polymerizable oligomer (macromonomer) used in order to obtain the graft chain not having an amino group is preferably a polymerizable oligomer represented by Formula (D3) below.

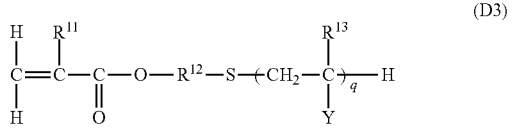

(D3)

$R^{11}$ and $R^{13}$ independently denote a hydrogen atom or a methyl group. $R^{12}$ denotes an alkylene group having 1 to 12 carbons, and preferably an alkylene group having 2 to 4 carbons. The alkylene group may have a substituent (e.g. a hydroxy group), and may be bonded via an ester bond, an ether bond, an amide bond, etc. Y denotes a phenyl group, a phenyl group having an alkyl group having 1 to 4 carbons, or —COOR$^{14}$ (R$^{14}$ denotes an alkyl group having 1 to 6 carbons, a phenyl group, or an arylalkyl group having 7 to 10 carbons), and q is 20 to 200. Y is preferably a phenyl group or —COOR$^{14}$ (R$^{14}$ denotes an alkyl group having 1 to 12 carbons).

Furthermore, the repeating units in Formula (D3) need not be of a single type, and it may be a copolymer comprising a plurality of repeating units.

Preferred examples of the polymerizable oligomer (macromonomer) include poly(methyl (meth)acryl ate), poly(n-butyl (meth)acryl ate), poly(i-butyl (meth)acrylate), and a polymer having a (meth)acryloyl group bonded to one terminus of a polystyrene molecule. Such polymerizable oligomers that are commercially availably include a single terminal methacryloylated polystyrene oligomer (Mn=6,000, product name: AS-6, Toagosei Co., Ltd.), a single terminal methacryloylated polymethyl methacrylate oligomer (Mn=6,000, product name: AA-6, Toagosei Co., Ltd.), a single terminal methacryloylated poly-n-butyl acrylate oligomer (Mn=6,000, product name: AB-6, Toagosei Co., Ltd.), and a single terminal methacryloylated poly(n-butyl methacrylate-co-2-hydroxyethyl methacrylate) (Mn=6,000, product name: AX-707S, Toagosei Co., Ltd.).

The polymerizable oligomer used in order to obtain a graft chain not having an amino group is not only a polymerizable oligomer represented by Formula (D3) above, but is preferably a polymerizable oligomer represented by Formula (D4) below, and it is particularly preferably selected as appropriate according to the polymerizable compound (A) used.

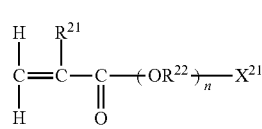

(D4)

$R^{21}$ denotes a hydrogen atom or a methyl group, and $R^{22}$ denotes an alkylene group having 1 to 8 carbons. $X^{21}$ denotes —OR$^{23}$ or —OCOR$^{24}$. $R^{23}$ and $R^{24}$ denote a hydrogen atom, an alkyl group, or an aryl group. n denotes 2 to 200.

In Formula (D4), $R^{21}$ denotes a hydrogen atom or a methyl group. The $R^{22}$s denote an alkylene group having 1 to 8 carbons; among them an alkylene group having 1 to 6 carbons is preferable, and an alkylene group having 2 to 3 carbons is more preferable. $X^{21}$ denotes —OR$^{23}$ or —OCOR$^{24}$. $R^{23}$ is preferably a hydrogen atom, an alkyl group having 1 to 18 carbons, a phenyl group, or a phenyl group substituted with an alkyl group having 1 to 18 carbons. $R^{24}$ is preferably an alkyl group having 1 to 18 carbons. Furthermore, n is 2 to 200, preferably 5 to 100, and more preferably 10 to 100.

Examples of the polymerizable oligomer represented by Formula (D4) above include polyethylene glycol mono(meth)acrylate, polypropylene glycol mono(meth)acrylate, polyethylene glycol polypropylene glycol mono(meth)acrylate, and polytetramethylene glycol monomethacrylate, and they may be commercial products or may be synthesized as appropriate.

The polymerizable oligomer represented by Formula (D4) above is commercially available as described above, and examples of the commercial products include methoxy polyethylene glycol methacrylate (product names: NK ESTER M-40G, M-90G, and M-230G, Shin-Nakamura Chemical Co., Ltd.; product names: BLEMMER PME-100, PME-200, PME-400, PME-1000, PME-2000, and PME-4000, NOF Corporation), polyethylene glycol monomethacrylate (product names: BLEMMER PE-90, PE-200, and PE-350, NOF Corporation), polypropylene glycol monomethacrylate (product names: BLEMMER PP-500, PP-800, and PP-1000, NOF Corporation), polyethylene glycol polypropylene glycol monomethacrylate (product name: BLEMMER70PEP-370B, NOF Corporation), polyethylene glycol polytetramethylene glycol monomethacrylate (product name: BLEMMER 55PET-800, NOF Corporation), and polypropylene glycol polytetramethylene glycol monomethacrylate (product name: BLEMMER NHK-5050, NOF Corporation).

The specific polymer (D) used in the present invention may be a copolymer of the above-mentioned specific polymer component with another copolymerizable monomer. Examples of said other monomer that is copolymerizable therewith include an aromatic vinyl compound (e.g. styrene, α-methylstyrene, vinyltoluene, 2-vinylpyridine, 4-vinylpyridine, N-vinylimidazole, etc.), an alkyl (meth)acrylate (e.g. methyl (meth)acrylate, ethyl (meth)acrylate, n-butyl (meth)acrylate, i-butyl (meth)acrylate, etc.), an alkylaryl (meth)acrylate (e.g. benzyl (meth)acrylate, etc.), a substituted alkyl (meth)acrylate (e.g. glycidyl (meth)acrylate, 2-hydroxyethyl (meth)acrylate, etc.), a vinyl carboxylate (e.g. vinyl acetate and vinyl propionate), a vinyl cyanide (e.g. (meth)acrylonitrile and α-chloroacrylonitrile), and an aliphatic conjugated diene (e.g. 1,3-butadiene or isoprene). Among them, an alkyl (meth)acrylate, an alkylaryl (meth)acrylate, and a vinyl carboxylate are preferable.

In the present invention, the specific polymer (D) is preferably a copolymer formed from a constituent repeating unit having a repeating unit of Formula (D1) in a graft chain and a constituent repeating unit supplied by the polymerizable oligomer (macromonomer) having a graft chain not having an amino group, or a copolymer formed from a constituent repeating unit having a repeating unit of Formula (D1) in a graft chain, a constituent repeating unit supplied by the polymerizable oligomer (macromonomer) having a graft chain not having an amino group, and another monomer unit that is copolymerizable with these specific polymer components. The copolymer preferably has the graft chain (side chain) having a repeating unit of Formula (D1) at 2 to 50 wt %, and more preferably 5 to 30 wt %. Moreover, it is preferable for it to contain the graft chain (side chain) supplied by the polymerizable oligomer (macromonomer) at 50 to 98 wt %, and more preferably 50 to 80 wt %.

Furthermore, when said other monomer that is copolymerizable with these specific polymer components is used, the content of said other monomer is preferably 5 to 30 wt % of the specific polymer (D).

The weight-average molecular weight (Mw) of the copolymer is preferably in the range of 1,000 to 200,000, and more preferably in the range of 10,000 to 100,000. This weight-average molecular weight is a polystyrene-basis weight-average molecular weight measured by gel permeation chromatography (carrier:tetrahydrofuran).

Examples of the graft copolymer suitably used as the specific polymer (D) are listed below, but the present invention is not limited thereto.

P-1) polymerizable oligomer represented by Compound Example d-1 above/terminal methacryloylated poly(n-butyl acrylate) copolymer P-2) polymerizable oligomer represented by Compound Example d-1 above/polyethylene glycol mono(meth)acrylate copolymer P-3) polymerizable oligomer represented by Compound Example d-1 above/terminal methacryloylated polycaprolactone copolymer P4) polymerizable oligomer represented by Compound Example d-2 above/terminal methacryloylated polymethyl methacrylate copolymer P-5) polymerizable oligomer represented by Compound Example d-2 above/polyethylene glycol mono(meth)acrylate copolymer P-6) polymerizable oligomer represented by Compound Example d-3 above/terminal methacryloylated polymethyl methacrylate copolymer P-7) polymerizable oligomer represented by Compound Example d-4 above/terminal methacryloylated polymethyl methacrylate copolymer P-8) polymerizable oligomer represented by Compound Example d-1 above/3-(N,N-dimethylamino)propylacrylamide/terminal methacryloylated polymethyl methacrylate copolymer P-9) polymerizable oligomer represented by Compound Example d-1 above/3-(N,N-dimethylamino)propylacrylamide/terminal methacryloylated polymethyl methacrylate/polyethylene glycol mono(meth)acrylate copolymer P-10) polymerizable oligomer represented by Compound Example d-1 above/styrene/polyethylene glycol mono(meth)acrylate copolymer Such a graft copolymer may be obtained by radically polymerizing in a solvent an amino group-containing polymerizable oligomer and a monomer having a nitrogen atom-containing group or another monomer, which are used in combination as desired. In this synthesis, a radical polymerization initiator is generally used, and in addition to the initiator a chain transfer agent (e.g. 2-mercaptoethanol or dodecylmercaptan) may be added.

The ink composition of the present invention may comprise only one type of specific polymer (D), or two or more types thereof in combination. The content of the specific polymer (D) in the ink composition is preferably 1 to 100 wt % of the amount of pigment added, and more preferably 5 to 50 wt %.

The ink composition of the present invention, as long as its effect is not impaired, may employ a known pigment dispersant in addition to the specific polymer (D). The amount of known pigment dispersant added is preferably no greater than 50 wt % of the specific polymer (D).

(E) Other Components

Sensitizer

In the present invention, in order to improve the sensitivity of the photopolymerization initiator, a sensitizer may be added. The sensitizer absorbs specific actinic radiation and attains an electronically excited state. Preferred examples of the sensitizer include those that belong to compounds below and have an adsorption wavelength in the region of 350 nm to 450 nm.

Polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

As the sensitizer, compounds represented by Formulae (IX) to (XIII) below are more preferable.

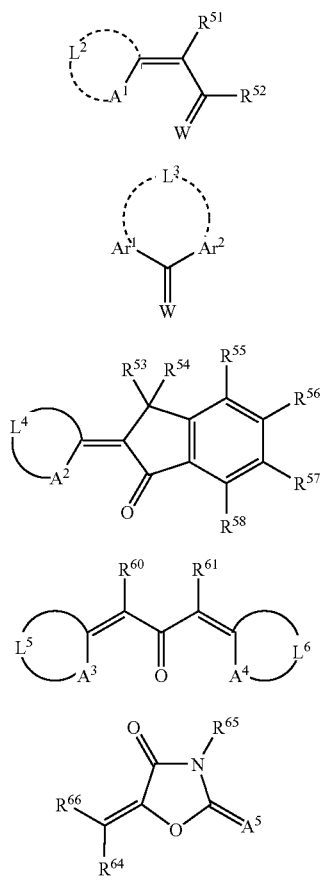

In Formula (IX), $A^1$ denotes a sulfur atom or —$NR^{50}$—, $R^{50}$ denotes an alkyl group or an aryl group, $L^2$ denotes a non-metallic atomic group forming a basic nucleus of a dye in cooperation with a neighboring $A^1$ and the neighboring carbon atom, $R^{51}$ and $R^{52}$ independently denote a hydrogen atom or a monovalent non-metallic atomic group, and $R^{51}$ and $R^{52}$ may be bonded together to form an acidic nucleus of a dye. W denotes an oxygen atom or a sulfur atom.

In Formula (X), $Ar^1$ and $Ar^2$ independently denote an aryl group and are connected to each other via a bond of -$L^3$-. Here, $L^3$ denotes —O— or —S—. W has the same meaning as that shown in Formula (IX).

In Formula (XI), $A^2$ denotes a sulfur atom or $NR^{59}$, $L^4$ denotes a non-metallic atomic group forming a basic nucleus of a dye in cooperation with the neighboring $A^2$ and carbon atom, $R^{53}$, $R^{54}$, $R^{55}$, $R^{56}$, $R^{57}$, and $R^{58}$ independently denote a monovalent non-metallic atomic group, and $R^{59}$ denotes an alkyl group or an aryl group.

In Formula (XII), $A^3$ and $A^4$ independently denote —S—, —$NR^{62}$—, or —$NR^{63}$—, $R^{62}$ and $R^{63}$ independently denote a substituted or unsubstituted alkyl group, or a substituted or unsubstituted aryl group, $L^5$ and $L^6$ independently denote a non-metallic atomic group forming a basic nucleus of a dye in cooperation with the neighboring $A^3$ and $A^4$ and neighboring carbon atom, and R60 and $R^{61}$ independently denote a hydrogen atom or a monovalent non-metallic atomic group, or are bonded to each other to form an aliphatic or aromatic ring.

In Formula (XIII), $R^{66}$ denotes an aromatic ring or a hetero ring, which may have a substituent, and $A^5$ denotes an oxygen atom, a sulfur atom, or —$NR^{67}$—. $R^{64}$, $R^{65}$, and $R^{67}$ independently denote a hydrogen atom or a monovalent non-metallic atomic group, and $R^{67}$ and $R^{64}$, and $R^{65}$ and $R^{67}$ may be bonded to each other to form an aliphatic or aromatic ring.

Specific examples of the compounds represented by Formulae (IX) to (XIII) include compounds (A-1) to (A-20) below.

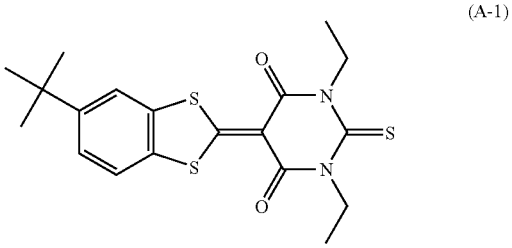
(A-1)

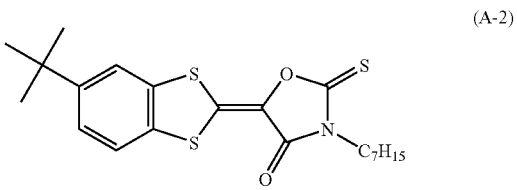
(A-2)

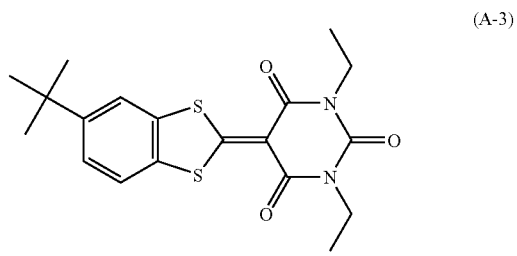
(A-3)

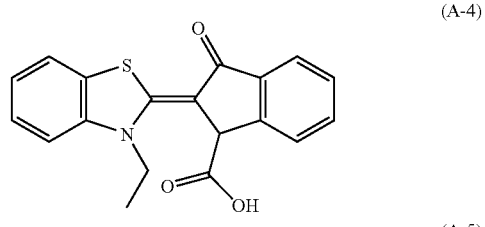
(A-4)

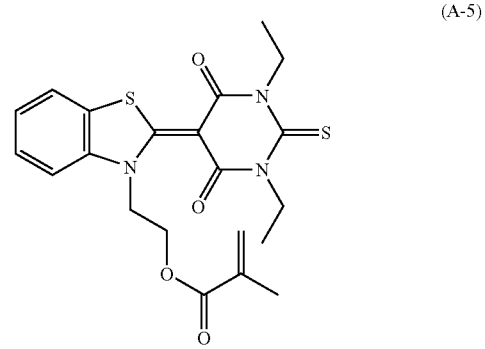
(A-5)

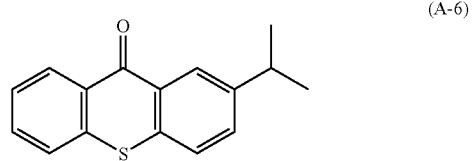
(A-6)

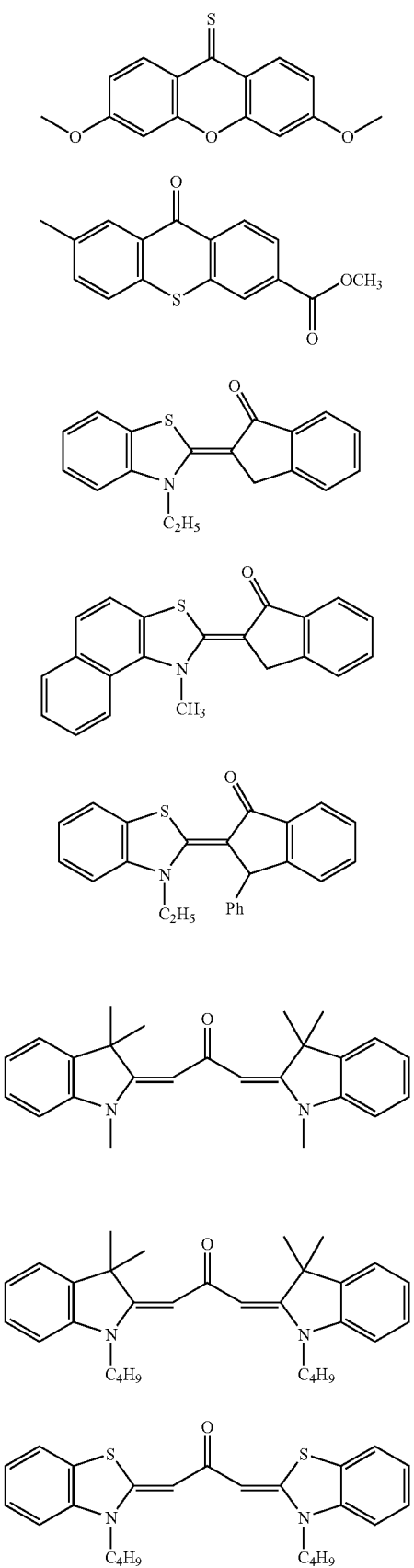
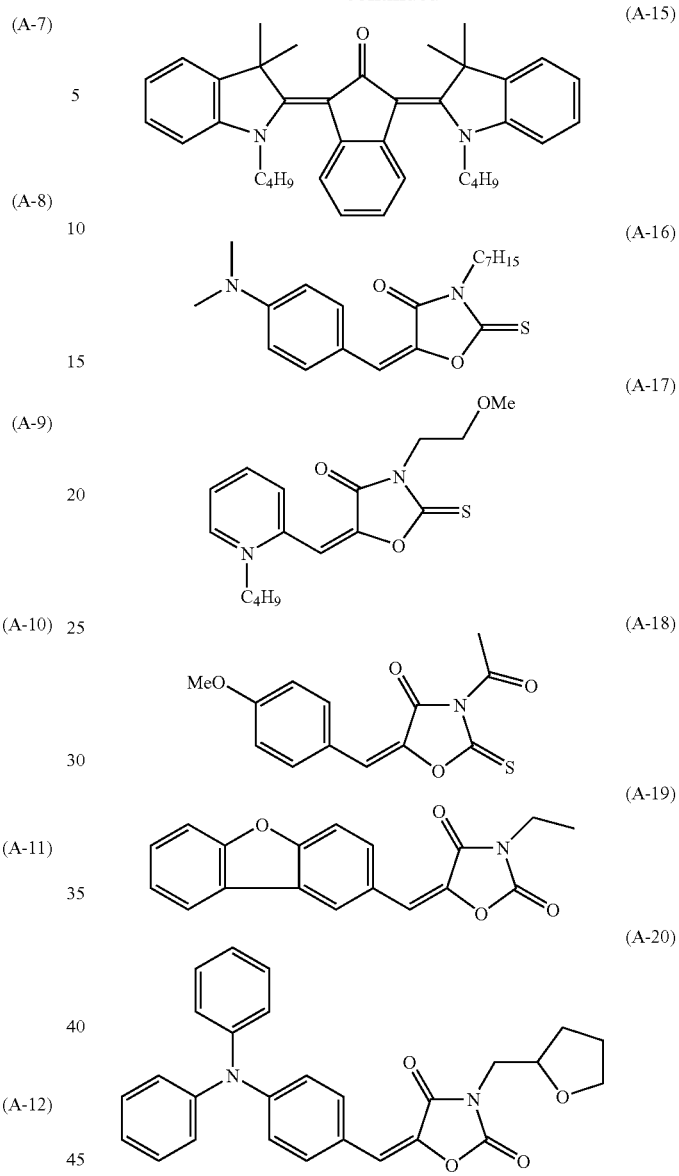

Cosensitizer

The ink composition of the present invention preferably comprises a cosensitizer. In the present invention, the cosensitizer has the function of further improving the sensitivity of the sensitizing dye to actinic radiation or the function of suppressing inhibition by oxygen of polymerization of the polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

The ink composition of the present invention may, depending on the intended application, employ various types of additives in addition to the sensitizer and the cosensitizer, which are used together with the polymerizable compound (A), the radical polymerization initiator (B), the pigment (C), and the specific polymer (D). For example, a UV absorber may be used from the viewpoint of improving the weather resistance of an image obtained and preventing discoloration. Moreover, in order to improve the stability of the ink composition, an antioxidant or a polymerization inhibitor may be added.

Furthermore, the ink composition of the present invention may contain various types of organic or metal complex-based anti-discoloration agents, conductive salts such as potassium thiocyanate, lithium nitrate, ammonium thiocyanate, or dimethylamine hydrochloride for the purpose of controlling discharge properties, and organic solvents in very small amounts in order to improve adhesion to a recording medium.

Furthermore, the ink composition of the present invention may contain various types of high molecular weight compounds in order to adjust film physical properties.

Moreover, it is possible to add to a nonionic surfactant, a cationic surfactant, an organofluoro compound, etc. to the ink composition of the present invention in order to adjust liquid physical properties.

In addition to the above, the ink composition of the present invention may contain as necessary, for example, a leveling additive, a matting agent, a wax for adjusting film physical properties, or a non polymerization inhibiting tackifier in order to improve the adhesion to a recording medium such as a polyolefin or PET.

Each of the additives is explained below.
Surfactant

It is preferable to add a surfactant to the ink composition of the present invention in order to impart long-term discharge stability.

As the surfactant, those described in JP-A-62-173463 and 62-183457 can be cited. Examples thereof include anionic surfactants such as dialkylsulfosuccinic acid salts, alkylnaphthalene sulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. An organofluoro compound may be used instead of the above-mentioned surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The radical polymerization inhibitor and the cationic polymerization inhibitor may be added from the point of view of enhancing the storage stability. When the ink composition of the present invention is used as an inkjet recording ink composition, it is preferably heated in the range of 40° C. to 80° C. to thus make it less viscous and then discharged, and in order to prevent clogging of a head due to thermal polymerization it is preferable to add a polymerization inhibitor. The polymerization inhibitor is preferably added at 200 to 20,000 ppm relative to the total amount of the ink composition of the present invention. Examples of the radical polymerization inhibitor include hydroquinone, benzoquinone, p-methoxyphenol, TEMPO, TEMPOL, Al cupferron, and tris(N-nitroso-N-phenylhydroxylamine) aluminum salt.
UV Absorber A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the ink composition.
Antioxidant In order to improve the stability of the ink composition, an antioxidant may be added. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is generally on the order of 0.1 to 8 wt % on the basis of the solids content in the ink composition.
Antifading Agent The ink composition of the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-215272, pages 127 to 137.

The amount thereof added is appropriately selected according to the intended application, and it is generally on the order of 0.1 to 8 wt % on the basis of the solids content in the ink composition.
Conductive Salt The ink composition of the present invention may contain, for the purpose of controlling discharge properties, a conductive salt such as potassium thiocyanate, lithium nitrate, ammonium thiocyanate, or dimethylamine hydrochloride.

Solvent

It is also effective to add a trace amount of organic solvent to the ink composition of the present invention in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the ink composition, and more preferably 0.1 to 3 wt %.

High Molecular Weight Compound

The ink composition may contain various types of high molecular weight compounds in order to adjust film physical properties. Examples of the high molecular weight compounds include acrylic polymers, polyvinylbutyral resins, polyurethane resins, polyamide resins, polyester resins, epoxy resins, phenol resins, polycarbonate resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

Basic Compound

It is preferable to add the basic compound from the viewpoint of improving the storage stability of the ink composition. As the basic compound that can be used in the present invention, a known basic compound may be used and, for example, a basic inorganic compound such as an inorganic salt or a basic organic compound such as an amine is preferably used.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Properties of Ink Composition

In the present invention, the ink composition has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink into the recording medium can be prevented, and uncured monomer can be reduced. Furthermore, ink spreading when ink droplets have landed can be suppressed, and as a result there is the advantage that the image quality is improved.

The surface tension of the ink composition of the present invention at 25° C. is preferably 20 to 35 mN/m, and more preferably 23 to 33 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 35 mN/m.

(2) Inkjet Recording Method and Inkjet Recording Device

The ink composition of the present invention is used for inkjet recording.

The inkjet recording method of the present invention is a method for forming an image by discharging the ink composition of the present invention onto a recording medium (support, recording material, etc.) for inkjet recording and curing the ink by irradiating the ink composition so discharged onto the recording medium with actinic radiation.

More particularly, the inkjet recording method of the present invention comprises ($a^1$) a step of discharging the ink composition of the present invention onto a recording medium and ($b^1$) a step of curing the ink composition by irradiating the ink composition so discharged with actinic radiation.

The inkjet recording method of the present invention comprises the steps ($a^1$) and ($b^1$) above and thus forms an image from the ink composition cured on the recording medium.

The printed material of the present invention is a printed material recorded by the inkjet recording method of the present invention.

The step ($a^1$) of the inkjet recording method of the present invention may employ an inkjet recording device that will be described in detail below.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink onto a recording medium in step ($a^1$) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink supply tank immediately before an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since it is desirable for the radiation curing type ink to be discharged at a constant temperature, an inkjet recording device preferably has a temperature stabilizing mean of the ink composition. A section from the ink supply tank to the inkjet head is preferably thermally insulated and heated.

A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since a good discharge stability can be obtained. By employing this method, high discharge stability can be realized.

The radiation curing type ink composition such as the ink composition of the present invention generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink discharge temperature as constant as possible. In the present invention, the control range for the temperature is preferably ±5° C. of a set temperature, more preferably ±2° C. of the set temperature, and yet more preferably ±1° C. of the set temperature.

In accordance with the preferred injection conditions, the ink composition of the present invention is repeatedly heated and cooled, but due to the function of the specific polymer (D), even if it is stored under such temperature conditions, it has the advantages that degradation in pigment dispersibility is suppressed, excellent coloration is obtained over a long period of time, and degradation in dischargeability caused by pigment aggregation is suppressed.

The step ($b^1$) of curing the discharged ink composition by irradiating the ink composition with actinic radiation is now explained.

The ink composition discharged onto the recording medium cures upon exposure to actinic radiation. This is due to an initiating species such as a radical, an acid, or a base being generated by decomposition of the polymerization initiator contained in the ink composition of the present invention by irradiation with actinic radiation, the initiating species functioning so as to make a polymerization reaction of a radically polymerizable compound take place and to promote it. In this process, if a sensitizing colorant is present together with the polymerization initiator in the ink composition, the sensitizing colorant in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is, for example, 200 to 600 nm, preferably 300 to 450 nm, and more preferably 350 to 420 nm.

Furthermore, in the present invention, the polymerization initiation system has sufficient sensitivity for low output actinic radiation. The actinic radiation is applied therefore so that the illumination intensity on the exposed surface is, for example, 10 to 4,000 mW/cm$^2$, and preferably 20 to 2,500 mW/cm$^2$.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink composition of the present invention is desirably exposed to such actinic radiation for, for example, 0.01 to 120 sec., and preferably 0.1 to 90 sec.

Irradiation conditions and a basic method for irradiation with actinic radiation are disclosed in JP-A-60-132767. Specifically, a light source is provided on either side of a head unit that includes an ink discharge device, and the head unit and the light source are made to scan by a so-called shuttle system. Irradiation with actinic radiation is carried out after a certain time (e.g. 0.01 to 0.5 sec., preferably 0.01 to 0.3 sec., and more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a recording method, it is possible to maintain a uniform dot diameter for landed ink even for various types of recording media having different surface wettability, thereby improving the image quality. In order to obtain a color image, it is preferable to superimpose colors in order from those with a low lightness. By superimposing inks in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way, the ink composition of the present invention is cured by irradiation with actinic radiation in high sensitivity to thus form an image on the surface of the recording medium.

The inkjet recording method of the present invention may suitably employ the ink composition of the present invention. The order in which ink compositions are discharged is not particularly limited, but it is preferable to apply to a recording medium from a ink composition having a low lightness; when the ink composition of yellow, cyan, magenta, and black are used, they are preferably applied on top of the recording medium in the order of yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of eight colors, that is, light cyan and light magenta, ink compositions, and cyan, magenta, black, white, and yellow dark ink compositions may preferably be used, and in this case they are applied on top of the recording medium in the order white→light cyan→light magenta→yellow→cyan→magenta→black.

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

Ink Set

The ink set is not particularly limited as long as it is an ink set having two or more types of ink compositions in combination, the ink set comprising in combination at least one ink composition of the present invention and another ink composition of the present invention or an ink composition other than one of the present invention, and it is preferable for the ink set to comprise at least one ink composition of the present invention having a color selected from cyan, magenta, yellow, black, white, light magenta, and light cyan.

Furthermore, the ink set comprising at least one ink composition of the present invention may be suitably used in the inkjet recording method of the present invention.

In order to obtain a full color image using the ink composition of the present invention, it is preferable to use, as the ink set, an ink set comprising in combination four dark ink compositions of yellow, cyan, magenta, and black, it is more preferable to use an ink set comprising in combination five dark ink compositions of yellow, cyan, magenta, black, and white. It is preferable to use an ink set comprising in combination five dark ink compositions of yellow, cyan, magenta, black, and white and two light ink compositions of light cyan and light magenta.

The 'dark ink composition' referred to in the present invention means an ink composition for which the content of the colorant exceeds 1 wt % of the entire ink composition. The colorant is not particularly limited; a known colorant may be used, and examples thereof include a pigment and an oil-soluble dye.

Furthermore, needless to say, the ink set of the present invention may comprise an ink composition containing a colorant other than a pigment at 1 wt % or less.

When the ink set comprises at least one dark ink composition and the light ink composition employing colorants of similar colors, the ratio of the colorant concentration of the dark ink composition to the colorant concentration of the light ink composition is preferably dark ink composition:light ink composition=15:1 to 4:1, more preferably 12:1 to 4:1, and yet more preferably 10:1 to 4.5:1. When the ratio is in the above-mentioned range, a vivid full color image with little feeling of grain can be obtained.

A printed material of the present invention may be obtained by carrying out printing on a recording medium using the ink composition of the present invention with an inkjet printer, and subsequently preferably curing the printed ink composition with actinic radiation. With regard to the printed material of the present invention, since the ink used for formation of an image comprises fine pigment particles uniformly and stably dispersed, a high quality image having excellent coloring properties and sharpness is given, and since the image also has excellent weatherability, the printed material can be applied in a wide range of fields.

In accordance with the present invention, it is possible to provide an ink composition suitable for inkjet recording, the ink composition enabling a high quality image to be formed with a fine pigment that has excellent dispersibility and stability and being capable of curing upon exposure to actinic radiation with high sensitivity, and to provide an inkjet recording method employing the ink composition. Furthermore, in accordance with the present invention, it is possible to provide a printed material obtained using the ink composition.

EXAMPLES

The present invention is explained more specifically below by reference to Examples, but the present invention should not be construed as being limited to the modes of these Examples.

The molecular weight of polymers in the Synthetic Examples below denotes weight-average molecular weight and was measured using GPC (HPLC LC-10AD, Shimadzu Corporation). Furthermore, GPC measurement was carried out with a Shodex GPC-KF-804 column (Showa Denko K. K.) using tetrahydrofuran (THF) as an eluent at 40° C. and a flow rate of 0.8 mL/sec. The molecular weight was calculated by comparison with a polystyrene standard.

Synthetic Example 1

Synthesis of Polymerizable Oligomer (d-1) Comprising Repeating Unit of Formula (D1)

A nitrogen-flushed three-necked flask was charged with 80 parts by weight of anhydrous propylene glycol monomethyl-ether acetate, 62.4 parts by weight of 3-dimethylaminopropylacrylamide (Tokyo Chemical Industry Co., Ltd.), and 5.36 parts by weight of 6-mercaptohexanol (Aldrich), stirred using a stirrer (Three-One Motor, Shinto Scientific Co., Ltd.), and heated to 105° C. while passing nitrogen into the flask. 0.288 parts by weight of VA-086 (2,2'-azobis[2-methyl-N-(2-hydroxyethyl)propionamide], Wako Pure Chemical Industries, Ltd.) was added thereto, and stirring was then carried out for 2 hours. A further 0.144 parts by weight of VA-086 was added thereto, and stirring and heating were carried out at 115° C. for 4 hours. After the reaction solution was cooled to 50° C., 6.39 parts by weight of Karenz MOI (2-methacryloyloxyethyl isocyanate, Showa Denko K. K.) was added thereto, and stirring was carried out for 5 hours. The reaction solution was reprecipitated in 4,000 parts by weight of n-hexane. After the solvent was removed by decantation, 120 parts by weight of methyl ethyl ketone was added thereto, thus giving amino group-containing polymerizable oligomer solution 1 (corresponding to the above-mentioned d-1) (solids concentration 28%, weight-average molecular weight 5,600).

Synthesis of Specific Polymer (D)
Synthesis of Specific Polymer 1

A nitrogen-flushed three-necked flask was charged with 2 parts by weight of methyl ethyl ketone (Wako Pure Chemical Industries, Ltd.), stirred using a stirrer (Three-One Motor, Shinto Scientific Co., Ltd.), and heated to 68° C. while passing nitrogen into the flask. Starting solution 1 below, which had been prepared separately, was added dropwise thereto over 2 hours. 2 hours after the dropwise addition was completed, 0.08 parts by weight of V-65 (2,2'-azobis(2,4-dimethylvaleronitrile), Wako Pure Chemical Industries, Ltd.) was added thereto, and heating and stirring was carried out at 78° C. for 3 hours. The reaction liquid thus obtained was poured into 1,000 parts by weight of hexane while stirring, and a precipitate thus formed was dried by heating, thus giving graft copolymer 1 (corresponding to the above-mentioned P-1). The weight-average molecular weight of graft copolymer 1 was 27,000.

Starting Material 1

| | |
|---|---|
| Polymerizable oligomer 1 (solids concentration 28%) | 14.3 parts by weight |
| Terminal methacryloylated poly(n-butyl acrylate) (AB-6, number-average molecular weight 6,000, Toagosei Co., Ltd.) | 16 parts by weight |
| V-65 (2,2'-azobis(2,4-dimethylvaleronitrile), Wako Pure Chemical Industries, Ltd.) | 0.2 parts by weight |
| Methyl ethyl ketone (Wako Pure Chemical Industries, Ltd.) | 12 parts by weight |

Synthetic Example 2

Graft copolymer 2 (corresponding to the above-mentioned P-2) was obtained in the same manner as in Synthetic example 1 except that the 'poly(n-butyl acrylate) having a terminal methacryloyl group' in Starting material 1 of Synthetic example 1 was changed to a methoxypolyethylene glycol methacrylate (NK ESTER M-230G, Shin-Nakamura Chemical Co., Ltd.). The weight-average molecular weight of graft copolymer 2 was 12,000.

Synthetic Example 3

Graft copolymer 3 (corresponding to the above-mentioned P-4) was obtained in the same manner as in Synthetic example 1 except that Starting solution 1 of Synthetic example 1 was changed to Starting solution 2 below. The weight-average molecular weight of graft copolymer 3 was 32,000.

Starting Solution 2

| | |
|---|---|
| Polymerizable oligomer 1 (solids concentration 28%) | 7.1 parts by weight |
| Terminal methacryloylated polymethyl methacrylate (AA-6, number-average molecular weight 6,000, Toagosei Co., Ltd.) | 16 parts by weight |
| N,N-Dimethylaminoethyl methacrylate (Tokyo Chemical Industry Co., Ltd.) | 2 parts by weight |
| V-65 (2,2'-azobis(2,4-dimethylvaleronitrile), Wako Pure Chemical Industries, Ltd.) | 0.2 parts by weight |
| Methyl ethyl ketone (Wako Pure Chemical Industries, Ltd.) | 19 parts by weight |

Synthetic Example 4

A nitrogen-flushed three-necked flask was charged with 29 parts by weight of cyclohexanone, stirred using a stirrer (Three-One Motor, Shinto Scientific Co., Ltd.), and heated to 90° C. while passing nitrogen into the flask. Starting solution 3 below, which had been prepared separately, was added dropwise thereto over 2 hours. 2 hours after the dropwise addition was completed, 0.06 parts by weight of V-65 (2,2'-azobis(2,4-dimethylvaleronitrile), Wako Pure Chemical Industries, Ltd.) was added thereto, and heating and stirring were carried out for 1 hour, thus giving a polymer having a solids content of 31%.

A nitrogen-flushed three-necked flask was charged with 0.016 parts by weight of polyethyleneimine (Aldrich) and 0.091 parts by weight of cyclohexanone, and while stirring using a stirrer 5.93 parts by weight of the polymer solution obtained above and 5.94 parts by weight of cyclohexanone were added thereto dropwise over 30 minutes. A reaction was continued for a further 1 hour, thus giving a graft copolymer 4 solution having a solids concentration of 15%. The weight-average molecular weight of graft copolymer 4 was 45,000.

Starting Solution 3

| | |
|---|---|
| n-Butyl methacrylate (Tokyo Chemical Industry Co., Ltd.) | 14 parts by weight |
| Methyl methacrylate (Wako Pure Chemical Industries, Ltd.) | 2.3 parts by weight |
| 2-Methacryloyloxyethyl isocyanate (Karenz MOI, Showa Denko K.K.) | 0.14 parts by weight |
| 2,2'-Azobisisobutyronitrile (Wako Pure Chemical Industries, Ltd.) | 0.32 parts by weight |
| Cyclohexanone (Wako Pure Chemical Industries, Ltd.) | 3.9 parts by weight |

Materials used in the present invention were as follows.
IRGALITE BLUE GLVO (cyan pigment, average particle size 0.16 μm, Ciba Specialty Chemicals)
CINQUASIA MAGENTA RT-355 D (magenta pigment, average particle size 0.13 μm, Ciba Specialty Chemicals)
NOVOPERM YELLOW H2G (yellow pigment, average particle size 0.13 μm, Clariant)
SPECIAL BLACK 250 (black pigment, average particle size 0.14 μm, Ciba Specialty Chemicals)
Tipaque CR60-2 (white pigment, average particle size 0.20 μm, Ishihara Sangyo Kaisha Ltd.)

Solsperse 28000 (dispersant, Lubrizol Japan Ltd.)
Solsperse 36000 (dispersant, Lubrizol Japan Ltd.)
Disper BYK-168 (polymeric dispersant, BYK Chemie)
FANCRYL FA-512A (dicyclopentenyloxyethyl acrylate, corresponding to Compound Example M-11, Hitachi Chemical Co., Ltd.)
FANCRYL FA-513A (dicyclopentanyl acrylate, corresponding to Compound Example M-12, Hitachi Chemical Co., Ltd.)
FANCRYL FA-512M (dicyclopentenyloxyethyl methacrylate, corresponding to Compound Example M-16, Hitachi Chemical Co., Ltd.)
N-Vinylcaprolactam (NVC, Aldrich)
Actilane 421 (propoxylated neopentyl glycol diacrylate, Akcros)
KAYARAD DPCA-60 (DPCA, caprolactone-modified dipentaerythritol hexaacrylate, Nippon Kayaku Co., Ltd.)
NK ESTER AMP-10G (PEA, phenoxyethyl acrylate, Shin-Nakamura Chemical Co., Ltd.)
NK ESTER LA (lauryl acrylate, Shin-Nakamura Chemical Co., Ltd.)
NK ESTER A-TMPT (trimethylolpropane triacrylate, Shin-Nakamura Chemical Co., Ltd.)
DPGDA (dipropylene glycol diacrylate, Daicel-UCB Co., Ltd.)
FIRSTCURE ST-1 (polymerization inhibitor, Chem First)
Lucirin TPO (photoinitiator, acylphosphine oxide-based photoinitiator (2,4,6-trimethylbenzoyidiphenylphosphine oxide), BASF)
Irgacure 819 (acylphosphine oxide-based photopolymerization initiator (bis(2,4,6-trimethylbenzoyl)phenylphosphine oxide), Ciba Specialty Chemicals)
Benzophenone (photopolymerization initiator, Wako Pure Chemical Industries, Ltd.) FIRSTCURE ITX (sensitizer, Chem First)
Irgacure 184 (photopolymerization initiator (1-hydroxycyclohexyl phenyl ketone), Ciba Specialty Chemicals)
Irgacure 369 (α-aminoalkylphenone-based photopolymerization initiator (2-benzyl-2-dimethylamino-1-(4-morpholinophenyl)butanone-1), Ciba Specialty Chemicals)
Irgacure 907 (α-aminoalkylphenone-based photopolymerization initiator (2-methyl-1-(4-methylthiophenyl)-2-morpholinopropan-1-one), Ciba Specialty Chemicals)
KF-353 (silicone-based surfactant, Shin-Etsu Chemical Co., Ltd.)
BYK-307 (silicone-based surfactant, BYK Chemie)
Preparation of Cyan Mill Base A

| | |
|---|---|
| IRGALITE BLUE GLVO | 30 parts by weight |
| Actilane 421 | 61 parts by weight |
| Specific polymer (graft copolymer 1 obtained in Synthetic example 1) | 9 parts by weight |

The components above were stirred and mixed to give Cyan mill base A. Preparation of Cyan mill base A was carried out by putting it into an M50 disperser motor mill (manufactured by Eiger) and dispersing using zirconia beads having a diameter of 0.65 mm at a peripheral speed of 9 m/s for 4 hours.
Preparation of Magenta Mill Base B

| | |
|---|---|
| CINQUASIA MAGENTA RT-335 D | 30 parts by weight |
| Actilane 421 | 61 parts by weight |
| Specific polymer (graft copolymer 1 obtained in Synthetic example 1) | 9 parts by weight |

The components above were stirred and mixed to give Magenta mill base B. Preparation of Magenta mill base B was carried out by putting it into an M50 disperser motor mill (manufactured by Eiger) and dispersing using zirconia beads having a diameter of 0.65 mm at a peripheral speed of 9 m/s for 10 hours.
Preparation of Yellow Mill Base C

| | |
|---|---|
| NOVOPERM YELLOW H2G | 30 parts by weight |
| Actilane 421 | 61 parts by weight |
| Specific polymer (graft copolymer 1 obtained in Synthetic example 1) | 9 parts by weight |

The components above were stirred and mixed to give Yellow mill base C. Preparation of Yellow mill base C was carried out by putting it into an M50 disperser motor mill (manufactured by Eiger) and dispersing using zirconia beads having a diameter of 0.65 mm at a peripheral speed of 9 m/s for 10 hours.
Preparation of Yellow Mill Base D

| | |
|---|---|
| NOVOPERM YELLOW H2G | 30 parts by weight |
| Actilane 421 | 65 parts by weight |
| Specific polymer (graft copolymer 1 obtained in Synthetic example 1) | 5 parts by weight |

The components above were stirred and mixed to give Yellow mill base D. Preparation of Yellow mill base D was carried out by putting it into an M50 disperser motor mill (manufactured by Eiger) and dispersing using zirconia beads having a diameter of 0.65 mm at a peripheral speed of 9 m/s for 10 hours.
Preparation of Yellow Mill Base E and Yellow Mill Base F
Dispersion of Yellow mill base E and Yellow mill base F was carried out in the same manner as for Yellow mill base C except that instead of the specific polymer (graft copolymer 1 obtained in Synthetic example 1), graft copolymer 2 obtained in Synthetic example 2 and graft copolymer 3 obtained in Synthetic example 3 were used respectively.
Preparation of Black Mill Base G

| | |
|---|---|
| SPECIAL BLACK 250 | 30 parts by weight |
| Actilane 421 | 61 parts by weight |
| Specific polymer (graft copolymer 1 obtained in Synthetic example 1) | 9 parts by weight |

The components above were stirred and mixed to give Black mill base G. Preparation of Black mill base G was carried out by putting it into an M50 disperser motor mill (manufactured by Eiger) and dispersing using zirconia beads having a diameter of 0.65 mm at a peripheral speed of 9 m/s for 7 hours.
Preparation of White Mill Base H

| | |
|---|---|
| Tipaque CR60-2 | 50 parts by weight |
| NK ESTER AMP-10G | 45 parts by weight |
| Specific polymer (graft copolymer 1 obtained in Synthetic example 1) | 5 parts by weight |

The components above were stirred and mixed to give White mill base H. Preparation of White mill base H was carried out by putting it into an M50 disperser motor mill (manufactured by Eiger) and dispersing using zirconia beads having a diameter of 0.65 mm at a peripheral speed of 9 m/s for 4 hours.

Preparation of Yellow Mill Base I

Yellow mill base I was obtained by carrying out dispersion in the same manner as for Yellow mill base C except that instead of the specific polymer (graft copolymer 1 obtained in Synthetic example 1), 'Solsperse 28000', which is a commercial pigment dispersant having a base in a main chain (Lubrizol Japan Ltd), was used.

Preparation of Yellow Mill Base J

Yellow mill base J was obtained by carrying out dispersion in the same manner as for Yellow mill base C except that instead of the specific polymer (graft copolymer 1 obtained in Synthetic example 1), 30 parts by weight of 'Disper BYK-168', which is a commercial pigment dispersant having a base in a main chain (effective component 30%, BYK Chemie), was used, and instead of 'Actilane 421', 40 parts by weight of 'NK ESTER AMP-10G' was used.

Preparation of Yellow Mill Base K

Yellow mill base K was obtained by carrying out dispersion in the same manner as for Yellow mill base C except that instead of the specific polymer (graft copolymer 1 obtained in Synthetic example 1), graft copolymer 4 synthesized in Synthetic example 4 was used.

Preparation of White Mill Base L

White mill base L was obtained by carrying out dispersion in the same manner as for White mill base H except that instead of the specific polymer (graft copolymer 1 obtained in Synthetic example 1), 'Solsperse 36000', which is a commercial pigment dispersant having an acidic group in a main chain (Lubrizol Japan Ltd), was used.

Inks of Examples 1 to 10 and Comparative Examples 1 to 6 were prepared by stirring the components shown in Table 1 using a high-speed water-cooled stirrer. Table 1 shows the parts by weight for each component.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Mill base (parts by weight) | Cyan A 6 | Cyan A 12 | Magenta B 12 | Yellow C 13 | Yellow D 13 | Yellow E 13 | Yellow F 13 | Black G 13 | White H 40 |
| Pigment | 1.8 | 3.6 | 3.6 | 3.9 | 3.9 | 3.9 | 3.9 | 3.9 | 12 |
| Actilane 421 (white: AMP-10G) | 3.66 | 7.32 | 7.32 | 7.93 | 8.45 | 7.93 | 7.93 | 7.93 | 24.4 |
| Specific polymer | 0.54 | 1.08 | 1.08 | 1.17 | 0.65 | 1.17 | 1.17 | 1.17 | 3.6 |
| NK ESTER AMP-10G | 27.1 | 7.5 | 20.3 | 1.3 | 1.3 | 1.8 | — | 13.8 | — |
| N-Vinylcaprolactam | 25 | — | 25 | — | — | — | 10.8 | — | — |
| FANCRYL FA-513A | — | — | — | — | — | — | 10 | — | — |
| FANCRYL FA-512A | 26.2 | 35 | 25 | 35 | 35 | 25 | 25 | 30 | 8.8 |
| FANCRYL FA-512M | — | — | — | — | — | 10 | — | — | — |
| NK ESTER LA | — | — | — | — | — | — | — | — | — |
| DPGDA | — | 35 | — | 35 | 35 | 35 | 25 | 30 | 36 |
| Disper BYK-168 | — | — | — | — | — | — | — | — | — |
| NK ESTER A-TMPT | — | 1 | — | 1 | 1 | 1 | 2 | 1 | 3 |
| KAYARAD DPCA-60 | 2 | — | 2 | — | — | — | — | — | — |
| Lucirin TPO | 8.5 | 5.5 | 8.5 | 5.5 | 5.5 | 5 | 5 | 5 | 4 |
| Irgacure 819 | — | 4 | — | 4 | 4 | 4 | 4 | 5 | 6 |
| Irgacure 184 | 2 | — | 2 | — | — | — | — | — | — |
| Irgacure 369 | — | 2 | — | 2 | 2 | 2 | 2 | — | — |
| Irgacure 907 | — | — | — | — | — | — | — | 2 | 2 |
| Benzophenone | 3 | — | — | — | — | — | — | — | — |
| FIRSTCURE ITX | — | 3 | 5 | 3 | 3 | 3 | 3 | — | — |
| FIRSTCURE ST-1 | 0.1 | 0.1 | 0.1 | 0.1 | 0.1 | 0.1 | 0.1 | 0.1 | 0.1 |
| KF353 | 0.1 | — | 0.1 | — | — | — | — | — | 0.1 |
| BYK-307 | — | 0.1 | — | 0.1 | 0.1 | 0.1 | 0.1 | 0.1 | — |

| | Ex. 10 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Mill base (parts by weight) | White H 40 | Cyan A 6 | Yellow I 13 | Yellow J 13 | Yellow J 13 | Yellow K 13 | White L 40 |
| Pigment | 12 | 1.8 | 3.9 | 3.9 | 3.9 | 3.9 | 12 |
| Actilane 421 (white: AMP-10G) | 24.4 | 3.66 | 7.93 | 5.2 | 5.2 | 7.93 | 24.4 |
| Specific polymer | 3.6 | 0.54 | 1.17 | 1.17 | 1.17 | 1.17 | 3.6 |
| NK ESTER AMP-10G | 2.3 | — | 10.3 | 10.3 | 9.1 | 10.3 | 2.3 |
| N-Vinylcaprolactam | 20 | — | 27 | 27 | 27 | 27 | 20 |
| FANCRYL FA-513A | — | — | — | — | — | — | — |
| FANCRYL FA-512A | 25 | — | 37 | 37 | 37 | 37 | 25 |
| FANCRYL FA-512M | — | — | — | — | — | — | — |
| NK ESTER LA | — | 38.3 | — | — | — | — | — |
| DPGDA | — | 38 | — | — | — | — | — |
| Disper BYK-168 | — | — | — | — | 1.2 | — | — |
| NK ESTER A-TMPT | — | 4 | — | — | — | — | — |
| KAYARAD DPCA-60 | 2 | — | 2 | 2 | 2 | 2 | 2 |
| Lucirin TPO | 8.5 | 8.5 | 8.5 | 8.5 | 8.5 | 8.5 | 8.5 |
| Irgacure 819 | — | — | — | — | — | — | — |
| Irgacure 184 | 2 | — | 10 | 2 | 2 | 2 | 2 |
| Irgacure 369 | — | 2 | — | — | — | — | — |
| Irgacure 907 | — | — | — | — | — | — | — |
| Benzophenone | — | — | — | — | — | — | — |
| FIRSTCURE ITX | — | 3 | — | — | — | — | — |
| FIRSTCURE ST-1 | 0.1 | 0.1 | 0.1 | 0.1 | 0.1 | 0.1 | 0.1 |

TABLE 1-continued

| | | | | | | | |
|---|---|---|---|---|---|---|---|
| KF353 | 0.1 | 0.1 | 0.1 | 0.1 | 0.1 | 0.1 | 0.1 |
| BYK-307 | — | — | — | — | — | — | — |

Inkjet Recording Method

Subsequently, recording was carried out on a recording medium using an experimental inkjet recording device having a piezo type inkjet nozzle. The ink supply system comprised a main tank, a supply pipe, an ink supply tank immediately before an inkjet head, a filter, and a piezo type inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo type inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 1,630 mW/cm², and irradiation started 0.1 sec. after the ink landed on the recording medium. The cumulative amount of light applied to an image was adjusted so as to be 1,500 mJ/cm². The UV lamp employed a HAN250NL high-cure mercury lamp (manufactured by GS Yuasa Corporation). Here, dpi referred to in the present invention denotes the number of dots per 2.54 cm. The recording medium employed an E5000 ester film (film thickness 125 μm, manufactured by Toyobo Co., Ltd.).

Viscosity Measurement Method

Measurement of viscosity in the examples was carried out using a Brookfield LVDV-I type B viscometer (Brookfield) at 25° C. with a rotor rotational speed of 20 rpm.

Change in Viscosity Over Time

Change in viscosity after storage was evaluated as follows using the ratio of the viscosity after storage to that before storage (viscosity after storage/viscosity before storage).

3: ratio of viscosities no greater than 1.05
2: ratio of viscosities greater than 1.05 but no greater than 1.15
1: ratio of viscosities greater than 1.15

Method for Measuring Curing Sensitivity

In accordance with the above-mentioned inkjet recording method, a solid printed image having an average film thickness of 12 μm was formed, and the tackiness of the image was evaluated by touch after the image was irradiated with ultraviolet rays.

The curing sensitivity was evaluated using the following criteria.

3: No tackiness on image.
2: Image was slightly tacky.
1: Uncured ink was transferred to the hand.

Method for Evaluating Continuous Discharge Properties

A line having a line width of 0.5 points was printed continuously for 30 minutes, the printed line was examined in terms of discontinuity, thinning, and the occurrence of mist around the line, and evaluation was made using the criteria below.

3: There was no line discontinuity, thinning, or mist at all. The continuous discharge properties were very good.
2: There was no line discontinuity, but there were some slightly thinned areas or slightly misty areas. The continuous discharge properties were good.
1: There were areas where the line was discontinuous, or there were areas with severe misting. The continuous discharge properties were poor.

Inkjet recording was carried out using the ink compositions obtained. The evaluation results are given in Table 2.

TABLE 2

| | Color | Viscosity before storage [mPa·s] | Change in viscosity over time | Curing sensitivity | Continuous discharge properties |
|---|---|---|---|---|---|
| Ex. 1 | Cyan | 17 | 3 | 3 | 3 |
| Ex. 2 | Cyan | 22 | 3 | 3 | 3 |
| Ex. 3 | Magenta | 18 | 3 | 3 | 3 |
| Ex. 4 | Yellow | 24 | 3 | 3 | 3 |
| Ex. 5 | Yellow | 21 | 3 | 3 | 3 |
| Ex. 6 | Yellow | 22 | 3 | 3 | 3 |
| Ex. 7 | Yellow | 21 | 3 | 3 | 3 |
| Ex. 8 | Black | 20 | 3 | 3 | 3 |
| Ex. 9 | White | 22 | 3 | 3 | 3 |
| Ex. 10 | White | 22 | 3 | 3 | 3 |
| Comp. Ex. 1 | Cyan | 16 | 3 | 1 | 3 |
| Comp. Ex. 2 | Yellow | 18 | 1 | 3 | 3 |
| Comp. Ex. 3 | Yellow | 16 | 1 | 3 | 2 |
| Comp. Ex. 4 | Yellow | 20 | 3 | 3 | 1 |
| Comp. Ex. 5 | Yellow | 19 | 1 | 3 | 2 |
| Comp. Ex. 6 | White | 25 | 1 | 3 | 2 |

What is claimed is:

1. An ink composition comprising:
(A) at least one polymerizable compound selected from the group consisting of a monofunctional radically polymerizable monomer having an aliphatic cyclic structure, an N-vinyllactam, and an aromatic monofunctional radically polymerizable monomer;
(B) a radical polymerization initiator;
(C) a pigment; and
(D) a graft copolymer having a repeating unit represented by Formula (D1) in a graft chain

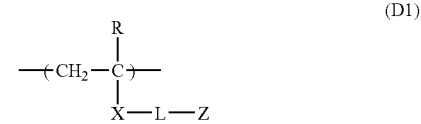

(in Formula (D1), R denotes a hydrogen atom or a methyl group, X denotes —(CO)O—, —CONR¹—, or a phenylene group, $R^1$ denotes a hydrogen atom, an alkyl group, an aryl group, or an aralkyl group, L denotes a single bond or a divalent linking group, Z denotes —NR²R³, $R^2$ and $R^3$ independently denote a hydrogen atom, an alkyl group, an aryl group, or an aralkyl group, and $R^2$ and $R^3$ may be bonded to each other to form a ring).

2. The ink composition according to claim 1, wherein the N-vinyllactam is N-vinylcaprolactam.

3. The ink composition according to claim 1, wherein the monofunctional radically polymerizable monomer having an aliphatic cyclic structure is represented by Formula (A2)

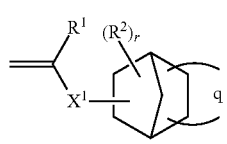

(A2)

(in Formula (A2), $R^1$ denotes a hydrogen atom, a halogen atom, or an alkyl group having 1 to 4 carbons, X' denotes a divalent linking group, $R^2$ denotes a monovalent or divalent substituent; the monovalent substituent is a hydroxyl group, an amino group, a thiol group, a siloxane group, or a hydrocarbon group or heterocyclic group having a total of no greater than 30 carbons, and the divalent substituent is an oxy group (=O), r denotes an integer of 0 to 5, q denotes a cyclic hydrocarbon structure, the cyclic hydrocarbon structure may comprise a carbonyl bond (—C(O)—) and/or an ester bond (—C(O)O—) in addition to a hydrocarbon bond, the r $R^2$s may be identical to or different from each other, and one carbon atom in the norbornane skeleton may be replaced by an ether bond (—O—) and/or an ester bond (—C(O)O—)).

4. The ink composition according to claim 3, wherein the compound represented by Formula (A2) is a compound represented by Formula (A3) or Formula (A4)

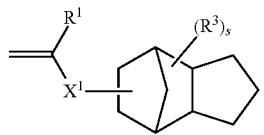

(A3)

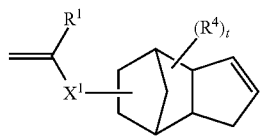

(A4)

(in Formula (A3) and Formula (A4), $R^1$ denotes a hydrogen atom, a halogen atom, or an alkyl group having 1 to 4 carbons, $X^1$ denotes a divalent linking group, $R^3$ and $R^4$ independently denote a monovalent or divalent substituent; the monovalent substituent is a hydroxyl group, an amino group, a thiol group, a siloxane group, or a hydrocarbon group or heterocyclic group having a total of no greater than 30 carbons, and the divalent substituent is an oxy group (=O), s and t independently denote an integer of 0 to 5, and the s $R^3$s and the t $R^4$s may be identical to or different from each other).

5. The ink composition according to claim 1, wherein the aromatic monofunctional radically polymerizable monomer is represented by Formula (A5)

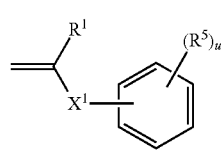

(A5)

(in Formula (A5), $R^1$ denotes a hydrogen atom, a halogen atom, or an alkyl group having 1 to 4 carbons, $X^1$ denotes a divalent linking group, $R^5$ denotes a hydroxyl group, an amino group, a thiol group, or a siloxane group, or a hydrocarbon group or a heterocyclic group having a total number of carbons of no greater than 30, u denotes an integer of 0 to 5, the u $R^5$s may be identical to or different from each other, and the plurality of $R^5$s may be bonded to each other to form a ring, which may be an aromatic ring).

6. The ink composition according to claim 1, wherein the polymerizable compound (A) comprises an N-vinyllactam and further comprises a monofunctional radically polymerizable monomer having an aliphatic cyclic structure and/or an aromatic monofunctional radically polymerizable monomer.

7. The ink composition according to claim 6, wherein it comprises 10 to 35 wt %, relative to the total ink composition, of the N-vinyllactam, and the monofunctional radically polymerizable monomer having an aliphatic cyclic structure and/or the aromatic monofunctional radically polymerizable monomer at 30 to 60 wt % of the total ink composition.

8. The ink composition according to claim 1, wherein the radical polymerization initiator (B) comprises an acylphosphine oxide compound.

9. The ink composition according to claim 1, wherein the graft copolymer (D) comprises 2 to 50 wt % of the graft chain having the repeating unit of Formula (D1).

10. The ink composition according to claim 1, wherein the graft copolymer (D) comprises a constituent repeating unit represented by Formula (D2)

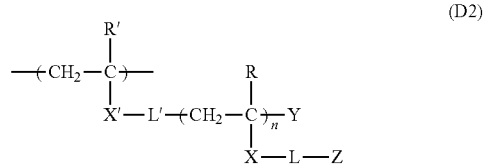

(D2)

(in Formula (D2), R and R' independently denote a hydrogen atom or a methyl group, X and X' independently denote —(CO)O—, —CONR$^5$—, or a phenylene group, $R^5$ denotes a hydrogen atom, an alkyl group, an aryl group, or an aralkyl group, L and L' independently denote a single bond or a divalent linking group, Y denotes a termination end of a vinyl polymer, Z denotes —NR$^6$R$^7$, $R^6$ and $R^7$ independently denote a hydrogen atom, an alkyl group, an aryl group, or an aralkyl group, and $R^6$ and $R^7$ may be bonded to each other to form a ring).

11. The ink composition according to claim 10, wherein the graft copolymer (D) further comprises a graft chain that does not have an amino group.

12. The ink composition according to claim 1, wherein it has a viscosity at 25° C. of no greater than 40 mPa·s.

13. An inkjet recording method comprising:
 ($a^1$) a step of discharging the ink composition according to claim 1 onto a recording medium; and
 ($b^1$) a step of curing the ink composition by irradiating the discharged ink composition with actinic radiation.

14. A printed material recorded by the inkjet recording method according to claim 13.

15. The ink composition according to claim 1, wherein the repeating unit represented by Formula (D1) comprises at least one of the repeating units represented below,

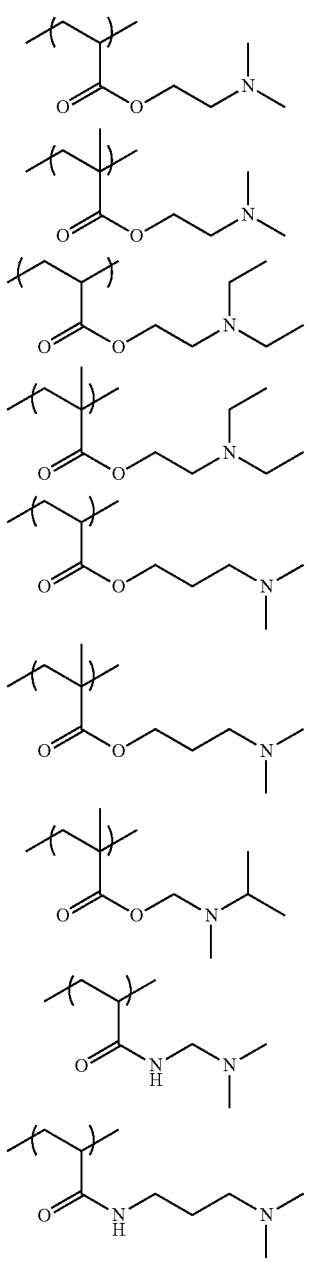
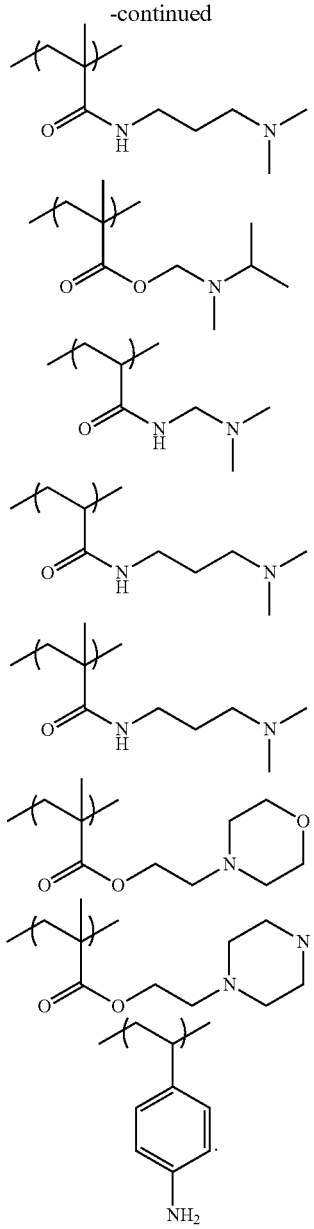
-continued
* * * * *